US011614529B1

(12) United States Patent
Rao et al.

(10) Patent No.: US 11,614,529 B1
(45) Date of Patent: *Mar. 28, 2023

(54) CONTROLLING EMISSION OF ULTRASONIC SIGNALS FOR PRESENCE DETECTION

(71) Applicant: Amazon Technologies, Inc., Seattle, WA (US)

(72) Inventors: Harsha Inna Kedage Rao, Santa Clara, CA (US); Maziyar Khorasani, San Francisco, CA (US); Tarun Pruthi, Fremont, CA (US); Krishna Kamath Koteshwara, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 68 days.

This patent is subject to a terminal disclaimer.

(21) Appl. No.: 17/206,456

(22) Filed: Mar. 19, 2021

(51) Int. Cl.
*G01S 7/52* (2006.01)
*G01S 15/04* (2006.01)

(52) U.S. Cl.
CPC ...... *G01S 7/52096* (2013.01); *G01S 7/52006* (2013.01); *G01S 15/04* (2013.01); *G01S 2007/52007* (2013.01)

(58) Field of Classification Search
CPC .. G01S 7/52096; G01S 7/52006; G01S 15/04; G01S 2007/52007
See application file for complete search history.

(56) References Cited

U.S. PATENT DOCUMENTS 10,795,018 B1 * 10/2020 Koteshwara ........... H04R 1/406
2014/0293747 A1 * 10/2014 Calvarese ............ G01S 15/523
367/95

* cited by examiner

Primary Examiner — Daniel Pihulic
(74) Attorney, Agent, or Firm — Lee & Hayes, P.C.

(57) ABSTRACT

Techniques for presence-detection devices to emission levels of ultrasonic signals that are used to detect movement in an environment. The presence-detection devices may detect movement of a person by emitting the ultrasonic signals into an environment, and characterizing the change in the frequency, or the Doppler shift, of the reflections of the ultrasonic signals off the person caused by the movement of the person relative to the presence-detection devices. However, presence-detection devices that continuously emit ultrasonic signals may experience reduced battery life, increased likelihood of overheating, etc. To reduce these negative effects, the presence-detection devices may reduce the emission levels of ultrasonic signals. For instance, once motion is detected, the presence-detection devices may, for a period of time, stop emitting ultrasonic signals or reduce the power level at which the ultrasonic signals are emitted. Accordingly, the presence-detection devices can reduce emission levels of ultrasonic signals while still detecting motion.

19 Claims, 12 Drawing Sheets

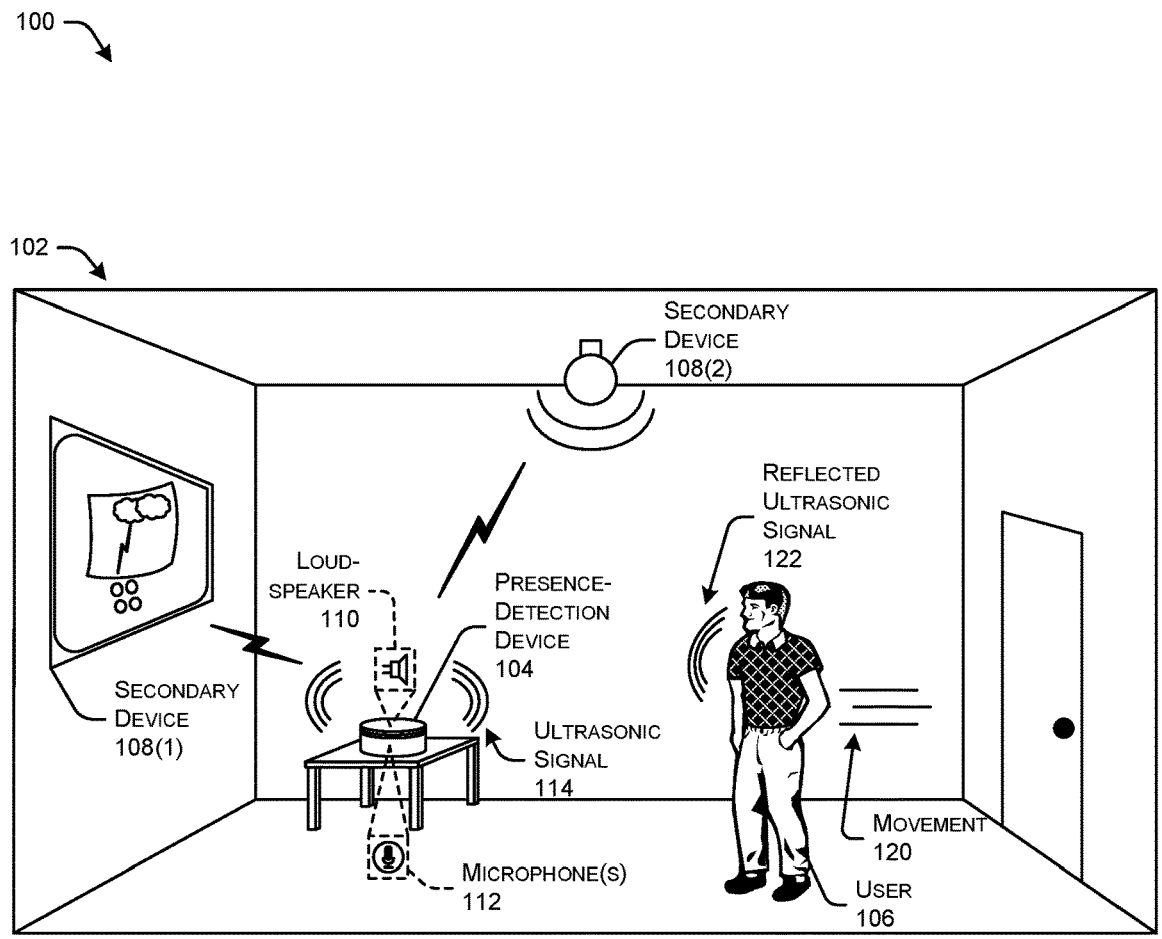
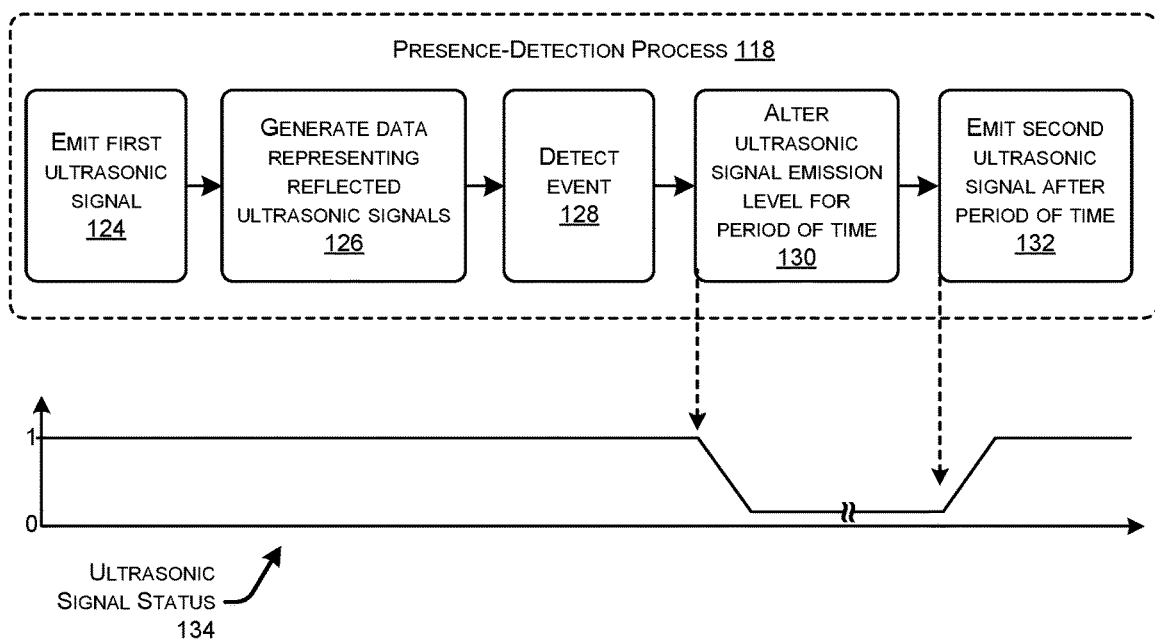
FIG. 1

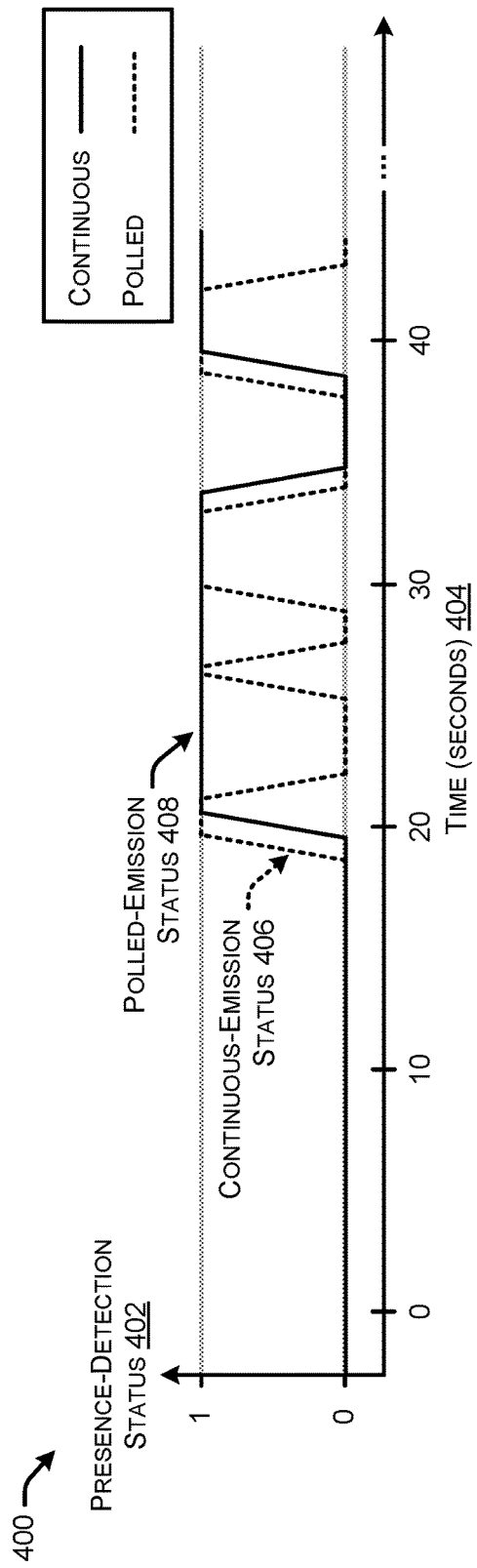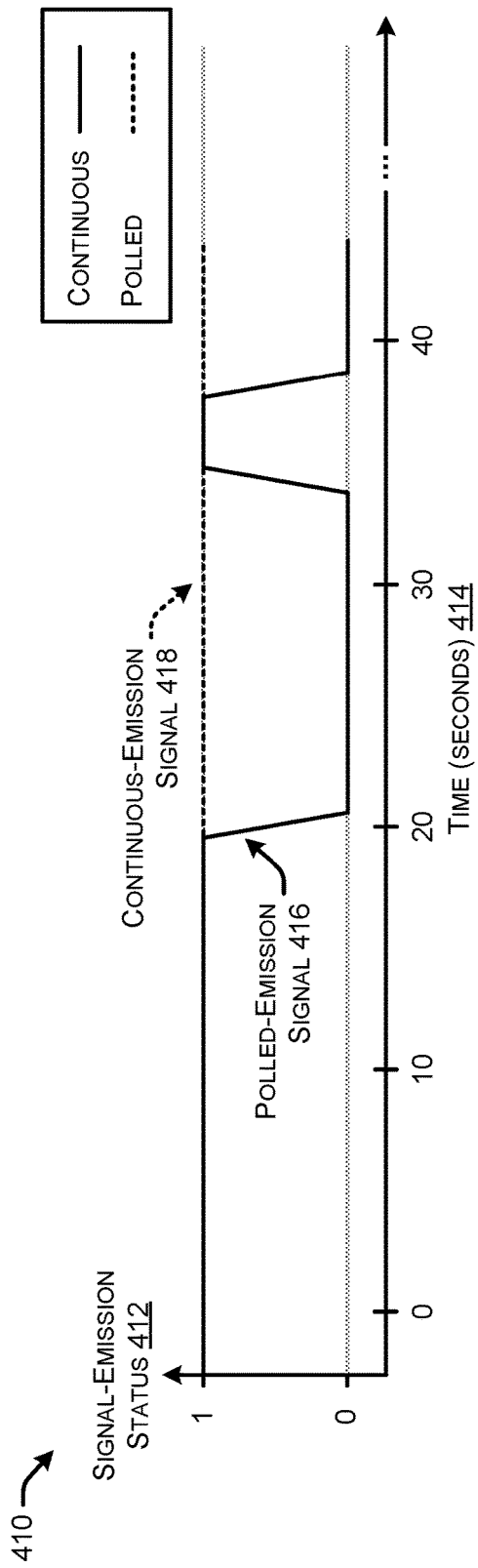

CONTROLLING EMISSION OF ULTRASONIC SIGNALS FOR PRESENCE DETECTION

BACKGROUND

Many devices and technologies exist for detecting the presence of users in different environments, and for different purposes. For instance, motion-sensing lights are used to automate lighting control based on detecting motion, motion-sensing security devices can trigger alarms upon detecting motion, etc. These presence-detection devices can utilize many different technologies to detect the presence and/or motion of a user in an environment, such as acoustic sensing, passive infrared sensing (PIR) sensing, Wi-Fi Channel Sate Information (CSI) sensing, radio-wave sensing, etc. In some examples, presence-detection devices may detect movement of a user by emitting ultrasonic signals into an environment, and characterizing the change in the frequency, or the Doppler shift, of the reflections of the ultrasonic signals off the user caused by the movement of the user relative to the presence-detection devices. However, various difficulties may arise when presence-detection devices emit ultrasonic signals for presence detection, such as high-power consumption that reduces battery life, increased likelihood of overheating, and so forth. Another difficulty is with environment factors interfering with ultrasound operation, which can require that emission be stopped to inspect noise or interference from the environment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 shows an illustrative presence-detection device in a user environment that is performing presence detection, while altering the emission of ultrasonic signals. The architecture includes the presence-detection device controlling secondary devices physically situated in the user environment based on detecting presence of a user. In this example, the presence-detection device has a loudspeaker and a microphone that are used to detect presence, and/or lack of presence, of a user.

FIG. 4A illustrates an example diagram of a polled-emission status as well as a continuous-emission status for a presence-detection device to perform presence detection using different techniques.

FIG. 4B illustrates an example diagram of a polled-emission signal as well as a continuous-emission signal when a presence-detection device performs presence detection using different techniques.

DETAILED DESCRIPTION

Figure 2:
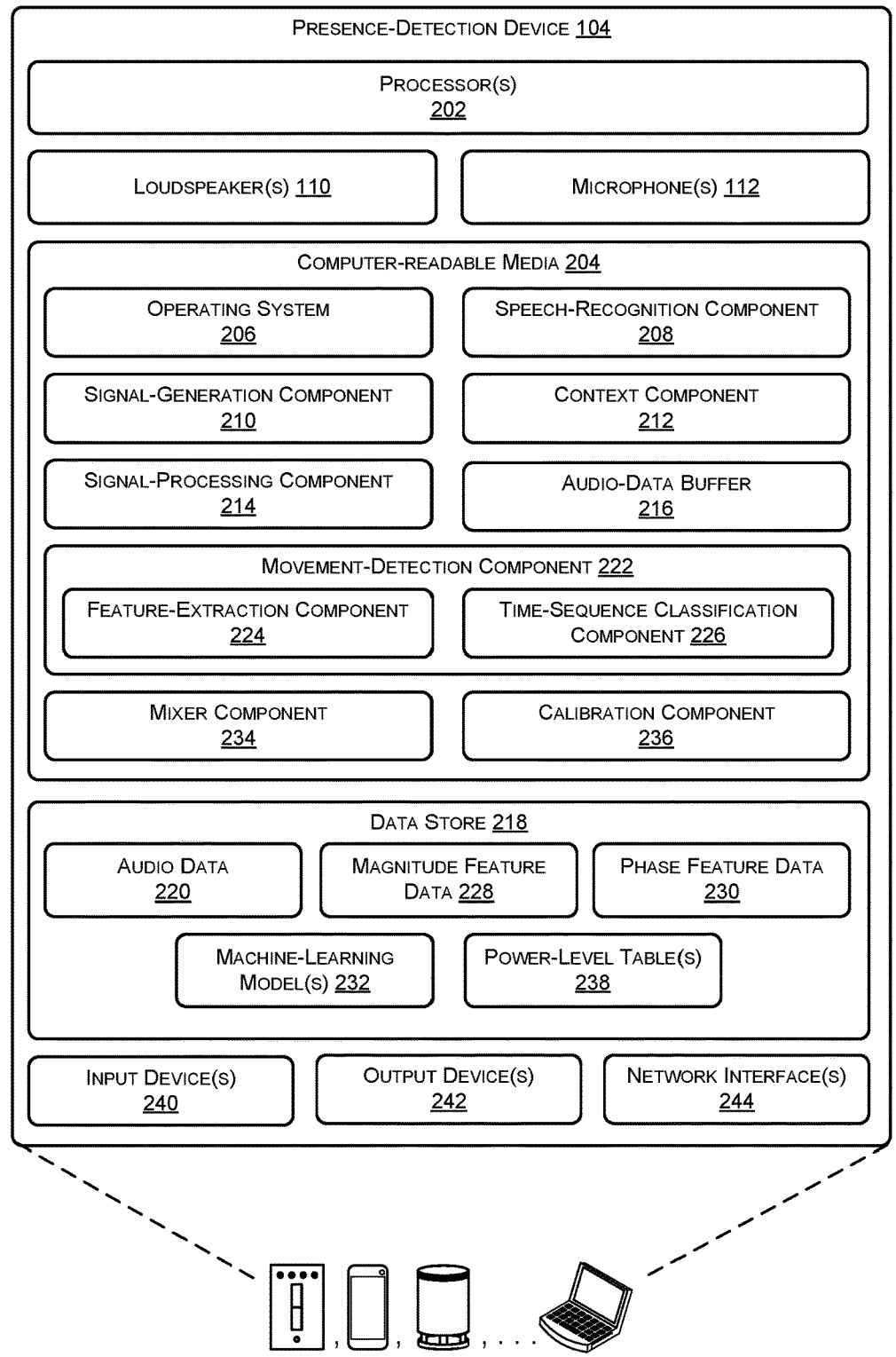
FIG. 2 illustrates an example configuration of components of a presence-detection device that reduces ultrasonic emissions during presence detection.

This disclosure describes techniques for presence-detection devices to alter the emission levels of ultrasonic signals that are used to detect movement in an environment. The presence-detection devices described herein may detect movement of a person in an environment by emitting the ultrasonic signals into the environment, and characterizing the change in the frequency, or the Doppler shift, of the reflections of the ultrasonic signals off the person caused by the movement of the person relative to the presence-detection devices. However, various difficulties may arise when presence-detection devices emit ultrasonic signals for presence detection. For instance, presence-detection devices that continuously emit ultrasonic signals to detect motion may experience reduced battery life, increased likelihood of overheating, and potentially other negative effects. To reduce these negative effects, the presence-detection devices may use various techniques to alter the emission levels of ultrasonic signals. For instance, the presence-detection devices may emit ultrasonic signals until motion is detected. Once motion is detected, the presence-detection devices may stop emitting ultrasonic signals for a period of time, or reduce the power level at which the ultrasonic signals are emitted for a period of time. In some examples, the presence-detection devices may, upon detecting motion, begin using a ramp signal that gradually increases from a lower-emission power to a higher-emission power until motion is detected in the environment. Accordingly, the techniques described herein may be used to alter the emission levels of ultrasonic signals used by presence-detection devices to detect motion.

The presence-detection devices described herein may be installed or placed in an environment to monitor a location, such as a room of a house. For instance, a presence-detection device may be a light switch that is installed in a room, a voice-interface device moved into a room to interact with a user through voice, a security-system device to monitor a location, etc. The presence-detection devices may emit ultrasonic signals into the room to determine if a user is present in the room, or depending on the use-case, whether the room is vacant. The presence-detection devices may use a loudspeaker to pulse an ultrasonic signal at the determined frequency, and analyze audio data generate by one or more microphones to detect one or more of (i) motion of a person, (ii) a direction of the motion of the person, or (iii) a number of people in the room. In some examples, the algorithms utilized by the presence-detection devices when analyzing the audio data to detect movement are based upon the Doppler Effect. Generally, the Doppler effect (or the Doppler shift) is the change (increase or decrease) in frequency or wavelength of a wave in relation to an object that is moving relative to the wave source. As an illustration, the Doppler effect is responsible for how a siren on an ambulance sounds louder and shriller as it approaches a person, and changes its pitch as soon as the ambulance passes the person.

To increase the likelihood of detection movement when it occurs, presence-detection devices can be configured to continuously emit ultrasonic signals. However, as noted above, continuous emission of ultrasonic signals can reduce battery life, increase the likelihood of overheating, and potentially have other negative impacts. Although the signals being emitted are in the ultrasonic range (e.g., inaudible to humans and animals), and while the ultrasonic signals are emitted at power levels that are safe for humans and other animals, it may be advantageous to reduce the exposure the humans and animals have to the ultrasonic signals.

In some instances, the presence-detection device may perform a zero-emission process in order to reduce ultrasonic signal emissions. For example, the presence-detection device may continuously, or periodically, emit ultrasonic signals into an environment to detect motion. In the zero-emission process, the presence-detection device may, upon detecting motion, shut down the ultrasound emission for a configurable period of time. For instance, ultrasound emission may be shut down for 30 seconds once motion is detected. Once the period of time elapses, the presence-detection device may return to emitting ultrasonic signals into the environment to detect motion. In this way, the presence-detection device may still be able to detect motion and take appropriate actions, but may also reduce the amount of time that ultrasonic signals are emitted, and the overall ultrasonic emission level.

In various examples, the presence-detection device may perform a reduced-emission process in order to reduce ultrasonic emissions. In the reduced-emission process, the presence-detection device may, upon detecting motion, reduce the ultrasound emission for a configurable period of time. For instance, ultrasound emission may be reduced for 27 seconds once motion is detected, and increased to normal operating ranges for 3 seconds to detect motion. That is, once the period of time elapses, the presence-detection device may return to emitting ultrasonic signals into the environment for 3 seconds to detect motion. In some instances, the ultrasound level may be reduced by an amount that results in the presence-detection device being unable to detect motion for the period of time. In other examples, the emission level may be reduced by an amount such that the presence-detection devices are able to detection motion near the device (e.g., within 3 feet, within 5 feet, etc.). In this way, the presence-detection device may still be able to detect motion and take appropriate actions, but may also reduce the amount of time that ultrasonic signals are emitted, and the overall ultrasonic emission level.

In some instances, the presence-detection device may perform an adaptive-emission process in order to reduce ultrasonic emissions. In the adaptive-emission process, the presence-detection device may, upon detecting motion, begin emitting an ultrasonic ramp signal that gradually increases from a relatively low emission power level towards the normal emission power level used in normal operation. The presence-detection device may analyze the reflections of the ultrasonic ramp signal as it increases in emission power to determine if the reflections represent motion. Upon detecting motion, the presence-detection device may either stop emitting ultrasonic signals for a period of time, reduce the emission power of the signals for a period of time, and/or begin emitting another ultrasonic ramp signal. Thus, the ultrasonic ramp signal may be emitted at relatively low emission power, and continue to increase in emission power until the necessary amount of power is used to detect movement (or lack of movement in the room). In this way, the presence-detection device may still be able to detect motion and take appropriate actions, but may also reduce the average power at which ultrasonic signals are emitted.

In various examples, the techniques may include changing the period of time during which emission is reduced (or stopped) based on previous events. Generally, the period of time may be varied based on previous events of detecting motion, or not detecting motion. For instance, if the presence-detection device detects motion, the period of time may be increased during which ultrasonic signal emission is reduced. Conversely, if the presence-detection device does not detect motion in a short period of time, then the presence-detection device may decrease the period of time during which ultrasonic emissions are reduced.

As a specific example, consider a scenario where a presence-detection device continues to emit ultrasonic signals into an environment and detects motion each time the signals are emitted. In such a scenario, the presence-detection device may infer that there is a lot of movement in the environment. In such examples, the presence-detection device may increase the period of time during which ultrasonic emission is reduced because it is likely that motion will be detected again when the period of time expires. In this way, the period of time may be configurable and modified based on a sequence of motion-detection events (or lack-thereof).

In some examples, the techniques described herein may include various optimizations. For instance, when the presence-detection devices are playing audible music data, or otherwise outputting audio in a human-audible frequency range, the presence-detection devices may be configured to determine how to mix the audible audio data with the ultrasonic audio data in such a way that presence detection is still enabled. For instance, the presence-detection devices may determine at what power level (e.g., volume level) the audible audio is being output, and select a power level for the ultrasonic signal to ensure that reflections of the ultrasonic signal will be received at the device. Generally, the higher the power level at which the audible audio is output, the higher the power level at which the ultrasonic signal is to be output.

Generally, the techniques described herein may be implemented when users of the presence-detection devices have opted in for use of the presence-detection services. For instance, users may interact with the presence-detection device, a user account associated with the presence-detection device, and/or otherwise indicate that they would like to use the presence-detection services described herein.

While the techniques described herein may be applied and useful in many scenarios, the presence-detection devices may perform various operations upon detecting movement of a person, detecting a direction of the movement of the person, and/or detecting the number of people in the room. For instance, the presence-detection devices may cause various secondary devices to turn on or off (e.g., lights, television, security alarm, etc.), optimize the output of music data to create auditory "sweet spots" for the person as they move through the room, perform more effective beamforming techniques based on the location and/or movement of the user, and so forth.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 shows an illustrative architecture 100 including a user environment 102 in which a presence-detection device 104 is performing presence detection, while reducing (or otherwise altering) the emission of ultrasonic signals. The architecture 100 includes at least one presence-detection device 104 controlling secondary devices 108 (e.g., television 108(1), light 108(2), or any other controllable device) physically situated in the user environment 102 based on detecting presence of a user 106. In this example, the presence-detection device 104 includes or has a loudspeaker 110 and one or more microphones 112 to detect presence, and/or lack of presence, of the user 106. The presence-detection device 104 may comprise any type of device, such as a fixed computing device (e.g., light switch, appliance, etc.), and/or a portable or mobile device such as voice-controlled devices, smartphones, tablet computers, media players, personal computers, wearable devices, various types of accessories, and so forth.

As shown in FIG. 1, the loudspeaker 110 of the presence-detection device 104 may transmit, or otherwise output, an ultrasonic signal 114. Generally, the loudspeaker 110 may comprise any type of electroacoustic transducer that convers an electric audio signal into a corresponding sound. In some instances, the loudspeaker 110 may be an existing on-board speaker configured to output sound within frequency ranges that are audible to humans, such as 35 Hz-20 kHz. However, in the illustrated example the ultrasonic signal 114 may include at least a pulsed, or a continuous, emission of the signal 114 at a frequency that is outside the frequency range in which humans can hear sound (e.g., over 20 kHz). Thus, the loudspeaker may be emitting an ultrasonic signal 114, such as ultrasonic signals, that are traditionally out-of-band for the loudspeaker 110. As illustrated, FIG. 1 may represent a high-level the presence-detection process 118 performed by the presence-detection device 104 in order to detect movement 120 of an object, such as the user 106. At 124, the presence-detection device 104 may cause the loudspeaker 110 to emit a first ultrasonic signal 112 (e.g., an ultrasonic sound, emitted ultrasonic sound, etc.) into the user environment 102. In some examples, the presence-detection device 104 may continuously cause the loudspeaker 110 to emit the ultrasonic signal 114, while in other examples, the ultrasonic signal 114 may be emitted periodically, or pulsed.

Upon being emitted, the ultrasonic signal 114 will generally reflect off of objects in the user environment 102. As briefly mentioned above, when the ultrasonic signal 114 bounces off objects, various changes to the characteristics of the audio signal may occur. For instance, as mentioned above, the Doppler effect (or Doppler shift) is one such change in audio signal characteristics where the frequency or wavelength of a wave, such as an emitted sound wave, changes in relation to an emitting object upon bouncing off of a moving object. In the illustrated example, the ultrasonic signal 114 may experience a change in frequency upon reflecting off the user 106 if the user 106 is moving. Thus, because there is movement 120 by the user 106, the reflected ultrasonic signal 122 (or reflected ultrasonic sound) may experience a change in frequency. Generally, if the movement 120 of the user 106 is towards the loudspeaker, then the reflected ultrasonic signal 122 may have a higher frequency compared to the emitted signal 114 when detected at the presence-detection device 104. Conversely, the reflected ultrasonic signal 122 may have a lower frequency relative to the presence-detection device 104 compared to the emitted signal 114 when the movement 120 of the user 106 is away from the presence-detection device 104.

At 126, the presence-detection device 104 may use the microphone(s) 112 to generate data representing the reflected ultrasonic signal 122. In some examples, the microphone(s) 112 may be an array and include two or more microphones arranged on, or in, the presence-detection device 104 in any pattern (e.g., rows of microphones, circular pattern on a surface, offset and/or alternating rows of microphones, etc.). Further, the microphone(s) 112 in a microphone array may be facing, or oriented, in different directions to capture sound from different directions with a better signal-to-noise ratio. Additionally, or alternatively, the presence-detection device 104 may performing acoustic processing on audio data/signals generated by microphones 112 of a microphone array in order to perform beamforming to perform directional signal/sound reception in the user environment 102. In this way, the microphones 112 in a microphone array may be configured to detect sound from different regions of the user environment 102 with stronger SNR values. Generally, the microphone(s) 112 may comprise one or more transducers that convert sound (e.g., reflected ultrasonic signal 122) into electrical signals, or audio data.

At 128, the presence-detection device 104 may detect an event associated with the presence-detection device 104. In some instances, detecting the event may include detecting the movement 120 using the data representing the reflected ultrasonic signals 122. For example, in order to analyze the data to determine whether the reflected ultrasonic signal 122 indicates movement 120 of the user 106 due to a change in frequency according to the Doppler effect, the presence-detection device 104 may divide the signal represented in the data into its frequency components, or its magnitude and phase components. For instance, the presence-detection device 104 may utilize one or more algorithms, such as Fast Fourier transform (FFT), to transform the signal represented in the data in the time domain into the frequency domain, and represent the frequency of the reflected ultrasonic signal 122 by the magnitude and phase components.

Once the reflected ultrasonic signal 122 is represented by its magnitude and phase components, the presence-detection device 104 may further utilize a log-transform to transform the magnitude components of the frequency of the reflected ultrasonic signal 122. For instance, due to the high-dynamic range of the magnitude components of the frequency of the reflected ultrasonic signal 122, and because the amount of reflection that occurs from movement 120 of the user 106 is relatively small (may appear similar to noise), the log-transform may transform the magnitude components using a log-transforming into a larger range. After applying a log-transform to the magnitude components, the change in magnitude caused by the reflection of the ultrasonic signal 114 off of the moving user 106 will be more easily identifiable.

In some examples, to determine whether the frequency response of the reflection of the ultrasonic signal indicates a reflection off of a moving object due to the Doppler effect, one or more machine-learning models may be trained and utilized as classifiers to indicate whether movement has been detected in the environment 100. For instance, a machine-learning model, such as a neural network, may be trained with training data, such as training data that is tagged as no movement (or minor movement), and training data tagged as movement (or major movement such as walking). Generally, the training data may comprise feature vectors of magnitudes of reflections of different ultrasonic signals off of objects over a period of time (e.g., windowing and feature stacking to represent the period of time). In this way, the machine-learning models may be trained to identify input vectors as representing reflections of ultrasonic signals 114 that reflected off a moving object, or that did not reflect off a moving object.

Further, the one or more machine-learning models may additionally be trained to identify the direction of movement of the object, such as the user 106, through the user environment 102. In instances where there are multiple microphones 112 (e.g., a microphone array), the multiple microphones may be orientated in different directions and that generate, or otherwise are used to create, multi-channel feature data for frequency components of the reflection of the ultrasonic signal, such as phase components. The machine-learning model(s) may be trained using feature vectors that represent the phase components, or the feature vectors/feature data representing the phase components, from multiple microphones 112, or multiple of the multi-channel feature data sources. For instance, the machine-learning model(s) may be trained to identify, based on a comparison between phase components representing the reflection 122 of the ultrasonic signal 114 detected by two different microphones 112, a direction of the user 106 as he or she moves through the environment 102. As an example, a first microphone 112 may capture audio data representing a reflected ultrasonic signal 122 for 8 seconds of time, and a second microphone 112 that is oriented in a different direction may capture audio data representing the reflected ultrasonic signal 122 for substantially the same 8 seconds of time. Feature vectors may be created for each of those audio channel sources that represent the phase of the frequency response of the reflected ultrasonic signal 122. The machine-learning model(s) may be trained to determine, based on a comparison (e.g., subtraction) of the feature vectors representing phase components, a direction of movement of the object as it moves during those 8 seconds. In this way, two (or more) microphones 112 in a microphone array may be utilized to determine the direction the user 106 (or another object) is moving in the environment 102.

In even further examples, the machine-learning models may be trained to determine a number of people in the environment 102 that are moving. As an example, the array of microphones 114 in the presence-detection device 104 may include microphones 112 that are oriented in different directions. For instance, a first microphone 112 may be facing, and/or performing beamforming techniques, to generate audio data representing sound emanating from a 180-degree difference than an orientation at which a second microphone 112 in the array is facing/beamforming to capture reflected ultrasonic signals 122. The machine-learning models may be trained to determine, based on the feature data, that because each of the microphones 112 are generating audio data which represent movement, and the audio data is being captured with, for example, higher than a threshold SNR value (meaning the object is in the beamforming field for each microphone), then there may be at least two objects moving in the environment 102.

In some instances, detecting the event 128 may include detecting a command to output audible sound and/or adjust a volume at which audible sound is being output. For instance, the user 106 may provide input (e.g., touch input, voice input, etc.) that includes a command for the presence-detection device 104 to output audible sound (e.g., play music, read news, etc.), and/or adjust a volume at which concurrent audible sound is being output.

After detecting the event at 128, the presence-detection device 104 may alter an ultrasonic signal 114 emission level for a configurable period of time. For instance, if the presence-detection device 104 detects motion, the presence-detection device 104 may perform one or more of a zero-emission process, a reduced-emission process, and/or an adaptive-emission process. In the zero-emission process, the presence-detection device 104 may, upon detecting motion, shut down the ultrasound emission for a configurable period of time. For instance, ultrasound emission may be shut down for 30 seconds once motion is detected. Once the period of time elapses, the presence-detection device 104 may return to emitting ultrasonic signals 114 into the environment 102 to detect motion. In the reduced-emission process, the presence-detection device 104 may, upon detecting motion, reduce the ultrasound emission for a configurable period of time. For instance, ultrasound emission may be reduced for 27 seconds once motion is detected, and increased to normal operating ranges for 3 seconds to detect motion. That is, once the period of time elapses, the presence-detection device 104 may return to emitting ultrasonic signals 114 into the environment 102 for 3 seconds to detect motion. In some instances, the ultrasound level may be reduced by an amount that results in the presence-detection device being unable to detect motion for the period of time. In other examples, the emission level may be reduced by an amount such that the presence-detection devices are able to detection motion near the device (e.g., within 3 feet, within 5 feet, etc.). In this way, the presence-detection device 104 may still be able to detect motion and take appropriate actions, but may also reduce the amount of time that ultrasonic signals are emitted, and the overall ultrasonic emission level.

In the adaptive-emission process, the presence-detection device 104 may, upon detecting motion, begin emitting an ultrasonic ramp signal that gradually increases from a relatively low emission power level towards the normal emission power level used in normal operation. The presence-detection device 104 may analyze the reflections of the ultrasonic ramp signal as it increases in emission power to determine if the reflections represent motion. Upon detecting motion, the presence-detection device 104 may either stop emitting ultrasonic signals 114 for a period of time, reduce the emission power of the signals 114 for a period of time, and/or begin emitting another ultrasonic ramp signal. Thus, the ultrasonic ramp signal may be emitted at relatively low emission power, and continue to increase in emission power until the necessary amount of power is used to detect movement (or lack of movement in the room).

In some examples, the period of time may be varies based on previous events. For instance, if the presence-detection device 104 detects motion, the period of time may be increased during which ultrasonic signal 114 emission is reduced. Conversely, if the presence-detection device 104 does not detect motion in a short period of time, then the presence-detection device 104 may decrease the period of time during which ultrasonic emissions are reduced. As a specific example, consider a scenario where a presence-detection device 104 continues to emit ultrasonic signals 114 into the environment 102 and detects motion each time the signals are emitted. In such a scenario, the presence-detection device 104 may infer that there is a lot of movement in the environment 102. In such examples, the presence-detection device 104 may increase the period of time during which ultrasonic emission is reduced because it is likely that motion will be detected again when the period of time expires. In this way, the period of time may be configurable and modified based on a sequence of motion-detection events (or lack-thereof).

In some instances, altering the ultrasonic signal emission may include changing the power level at which the ultrasonic signal 114 is emitted based on whether or not audible sound is being concurrently output. For instance, if the user 106 increases the volume level at which audible audio is being output, the presence-detection device 104 may increase the power level at which the ultrasonic signal 114 is being output. Conversely, if the user 106 decreases the volume at which concurrent audible audio is being output, the presence-detection device 104 may decrease the power level at which the ultrasonic signal 114 is being output.

At 132, the presence-detection device 104 may emit a second ultrasonic signal 114 after the period of time. That is, once the configurable period of time has elapsed, the presence-detection device 104 may emit another ultrasonic signal 114 in order to determine if there is movement in the environment 102.

FIG. 1 illustrates an example plot of an ultrasonic signal status 134 where a "1" indicates that the ultrasonic signal 114 is being emitted at a power level usable to detect motion, and a "0" indicates that the ultrasonic signal 114 is either not being emitted (e.g., zero-emission process) for a period of time, or is being emitted at a power level at which motion is unable to be detected.

FIG. 2 illustrates an example configuration of components of a presence-detection device 104 that alters ultrasonic emissions during presence detection. Generally, the presence-detection device 104 may comprise any type of device, such as a fixed computing device (e.g., light switch, appliance, etc.), and/or a portable or mobile device such as voice-controlled devices, smartphones, tablet computers, media players, personal computers, wearable devices, various types of accessories, and so forth.

The presence-detection device 104 may include one or more processors 202 configured to execute various computer-executable instructions stored on the presence-detection device 104. Further, the presence-detection device 104 may include one or more loudspeakers 110 positioned at one or more locations on the presence-detection device 104. The loudspeakers 110 may include one loudspeaker 110, and/or an array of loudspeakers configured to coordinate the output of sound. The loudspeakers 110 may comprise any type of electroacoustic transducer which converts an electronic audio signal (e.g., audio data) into corresponding sound represented by the audio signal. In some examples, the loudspeaker(s) 110 may be simple onboard speakers designed to output sound in frequency ranges that are audible to humans, rather than being specialized ultrasonic transducers. However, in other examples the loudspeaker(s) 110 may be specialized ultrasonic transducers depending on the presence-detection device 104.

The presence-detection device 104 may further include the one or more microphones 112, which may be a microphone array 112 that comprises multiple microphones 112 which may include transducers that convert sound into an electrical audio signal. The microphone(s) 112 may include any number of microphones that are arranged in any pattern. For example, the microphone(s) 112 may be arranged in a geometric pattern, such as a linear geometric form, circular geometric form, or any other configuration. As an example, an array of four microphones may be placed in a circular pattern at 90-degree increments (e.g., 0, 90, 180, 270) to receive sound from four directions. The microphone(s) 112 may be in a planar configuration, or positioned apart in a non-planar three-dimensional region. In some implementations, the microphone(s) 112 may include a spatially disparate array of sensors in data communication. For example, a networked array of sensors may be included. The microphone(s) 112 may include omni-directional microphones, directional microphones (e.g., shotgun microphones), and so on.

The presence-detection device 104 may further include computer-readable media 204 that may be used to store any number of software and/or hardware components that are executable by the processor(s) 202. Software components stored in the computer-readable media 204 may include an operating system 206 that is configured to manage hardware and services within and coupled to the presence-detection device 104. The computer-readable media 204 may store a speech-recognition component 208 that, when executed by the processor(s) 202, perform speech-recognition on processed audio signal(s) to identify one or more voice commands represented therein. For instance, the speech-recognition component 208 may convert the audio signals into text data using automatic-speech recognition (ASR), and determine an intent for voice commands of the user 106 using natural-language understanding (NLU) on the text data. Thereafter, a command processor, stored in the computer-readable media 204 (and/or at a remote network-based system), may cause performance of one or more action in response to identifying an intent of the voice command. In the illustrated example, for instance, the command processor may issue an instruction to control a secondary device 108. For instance, the command processor may issue one or more instructions to the television 108(1) to show the weather channel, sends an instruction to dim the light 108(2), and/or output music using a loudspeaker 110.

The computer-readable media 204 may further store a signal-generation component 210 that, when executed by the processor(s) 202 generate audio signals/data that represent sound to be output by the loudspeaker(s) 110. The signal-generation component 210 may, for example, generate audio data representing ultrasonic signals that are output by the loudspeaker(s) 110 at a frequency that is above the audible range of humans. The signal-generation component 210 may generate ultrasonic signals at various power levels depending on, for example, a size of a room that the presence-detection device 104 is in. Further, the signal-generation component 210 may generate ultrasonic signals that are converted into sound by the loudspeaker(s) 110 according to various timing implementations, such as a continuously emitted signal, a pulsed sound, a periodically pulsed sound, etc. In some examples, the signal-generation component 210 may be configured to generate a calibration signal, such as an audio sweep signal, to determine audio characteristics of a room or other environment of the presence-detection device 104. In some instances, the signal-generation component 210 may be configured to perform techniques for reducing the emission level of ultrasonic signals 114 as described herein.

The computer-readable media 204 may further store a context component 212 configured to, when executed by the processor(s) 202, aggregate and communicate various contextual information between components. For example, as described in more detail in FIG. 3, the context component 212 may receive indications as to whether movement was detected by a movement-detection component 222. The context component 212 may provide interfaces between the signal-generation component 202 (e.g., transmit process) as well as an audio-data buffer 216 (e.g., clear the buffer if movement is detected).

The computer-readable media 204 may further include a signal-processing component 214 that, when executed by the processor(s) 202, perform various operations for processing audio data/signals generated by the microphone(s) 112. For example, the signal-processing component 214 may include components to perform low-pass filtering and/or high-pass filtering to ensure that speech and other sounds in the spectrum region of the ultrasonic signal does not affect baseband processing. For instance, the signal-processing component 214 may performing high-pass filtering for the audio data received in each audio channel for respective microphones 112 to remove sounds at lower frequencies that are outside or lower than of the frequency range of the ultrasonic signal and/or reflected signals that have shifted, such as speech (e.g., 100 Hz, 200 Hz, etc.) or other sounds in the environment 102. Further, the signal-processing component 214 may perform baseband carrier shifts (e.g., at 96 kHz) to shift or modulate the audio signal back to baseband frequency from the carrier frequency (e.g., 46 kHz, 21 kHz, etc.). Additionally, the signal-processing component 214 may perform low-pass filtering for each audio signal generated by each microphone in the array 112 after the baseband carrier shift to remove signals from the audio signals that are higher than a certain cutoff frequency that is higher than audio signals representing the ultrasonic signal (e.g., a cutoff frequency of than 30 kHz, 33 kHz, 35 kHz, and/or any other cutoff frequency higher than the ultrasonic signal frequency range).

In some examples, the signal-processing component 214 may perform integer down sampling, such as digital sampling, to remove certain samples from the audio signals. For example, the signal-processing component 214 may perform any form of digital down sampling or decimation to reduce the sampling rate of the audio signals, such as down sampling at a rate of 2 kHz (or another appropriate frequency). In this way, the signal-processing component 214 may produce an approximation or representation of the audio signals generated by the microphone(s) 112, but at a lower frequency rate. After down sampling the audio signals, the signal-processing component 214 may perform various signal processing, such as windowing, Fourier Transformations, and/or logarithmic transformations. For example, the signal-processing component 214 may perform various types of transforms to convert the audio signal from the time domain into the frequency domain, such as a Fourier transform, a fast Fourier transform, a Z transform, a Fourier series, a Hartley transform, and/or any other appropriate transform to represent or resolve audio signals into their magnitude (or amplitude) components and phase components in the frequency domain. Further, the signal-processing component 214 may utilize any type of windowing function on the audio data, such as the Hanning Window, the Hamming Window, Blackman window, etc. Additionally, the signal-processing component 214 may perform a logarithmic transform on the magnitude components to transform the magnitude components of the frequency of the reflected signal. For instance, due to the high-dynamic range of the magnitude components of the frequency of the reflected ultrasonic signal, and because the amount of reflection that occurs from movement of the user 106 is relatively small (may appear similar to noise), the logarithmic transform may transform the magnitude components into a larger range. After applying a logarithmic transform to the magnitude components, the change in magnitude caused by the reflection of the ultrasonic signal off of the moving object, or person, will be more easily identifiable.

In this way, the signal-processing component 214 may generate magnitude components and phase components that represent the frequency components (magnitude and phase) of the audio signals that represent reflected signals that correspond to the ultrasonic signal. Generally, the magnitude components and phase components may be complex numbers that represent the audio signals at each frequency. Thus, the magnitude components and phase components may represent frequency content for audio signals from each audio channel generated by the microphone(s) 112 after various digital processing has been performed on the audio signals by the signal-processing component 214. The magnitude components may be represented as logarithmic values (dB), and the phase components may be represented by radian and/or degree values. In this way, the signal-processing component 214 may generate magnitude components and phase components representing audio signals generated by two or more microphones in the microphone(s) 112 over a period of time (e.g., 8 seconds).

The computer-readable media 204 may further store or include an audio-data buffer 216 that is memory allocation which is configured to store audio data 220. The audio-data buffer 216 may store audio data that is configured by the signal-generation component 210 to be output by the loudspeaker(s) 110 (e.g., ultrasonic audio data, audible audio data, etc.). Further, the audio-data buffer 216 may store audio data that was generated using the microphone(s) 112 (e.g., reflected ultrasonic signals 114).

The presence-detection device 104 may further include a data store 218, which may comprise any type of storage (e.g., Random Operating Memory (ROM), disk storage, drive storage, Random-Access Memory (RAM), and/or any other type of storage). The data store 218 may store audio data 220 that represents sound, waves, signals, etc., that have been received by the microphone(s) 112. The audio data 220 may be of any type or types of audio file format usable for storing digital and/or analog audio data on a computer system.

The computer-readable media 204 may further store a movement-detection component 222 configured to detect motion by analyzing audio data 220 generated by the microphone(s) 112 that represent reflected ultrasonic signals 122. The movement-detection component 222 can include a feature-extraction component 224 that, when executed by the processor(s) 202, cause the processor(s) to extract the magnitude feature data 228 and phase feature data 230 from the magnitude and phase components generated by the signal-processing component 214. The feature-extraction component 224 may perform various operations for normalizing and stacking features of the magnitude components and phase components for each audio channel from the microphone(s) 112. For example, the feature-extraction component 224 may receive the complex numbers (e.g., magnitude components and phase components) and remove the first order statistics. Further, the feature-extraction component 224 may perform feature stacking to stack the magnitude components across N time intervals to create magnitude feature data 228, and stack the phase components to create phase feature data 230. In some examples, the feature-extraction component 224 may create the phase feature data 230 by determining differences between phase components of the different audio channel paths from the microphones 112 of an array.

In some examples, the feature-extraction component 224 may further perform normalization and remove background noise. For instance, the presence-detection device 104 may, at least periodically, activate one or more microphones 112 in the array to generate audio signals representing background noise in an environment 102 of the presence-detection device 104. The components of the presence-detection device 104 may analyze the background audio signal(s) representing the background noise, and the feature-extraction component 224 may further create background audio data which represents the background noise. Thus, once the feature-extraction component 224 has generated the magnitude feature data 228 and/or the phase feature data 230, the feature-extraction component 224 may utilize the background audio data to subtract, or otherwise remove, the representation of the background noise from the magnitude feature data 228 and/or the phase feature data 230. In this way, the feature-extraction component 224 may cause the background noise, such as a ceiling fan, a television, a refrigerator, etc., to not be represented in or by the magnitude feature data 228 and/or the phase feature data 230.

In some examples, the magnitude feature data 228 and the phase feature data 230 may generally represent binned frequency features over time, such as 1 dimensional binned frequency features over time that represent reflections of the ultrasonic signal. In various examples, the phase feature data 230 may comprise phase differences between multiple microphones, such as a phase difference between phase components of audio data generated at least in part by the respective microphones 112.

The computer-readable media 204 may further store a time-sequence classification component 226 configured to, when executed by the processor(s) 202, input the magnitude feature data 228 and the phase feature data 230 into one or more machine-learning model(s) 232 in order to classify the magnitude feature data 228 and/or phase feature data 230 as indicating movement of an object in the environment, a direction of the movement, and/or a number of objects moving in the environment. The machine-learning (ML) model(s) 232 may comprise any type of ML model(s) 232 (e.g., neural networks, linear regression, decision tree, Naïve Bayes, etc.) that may be trained to receive magnitude feature data 228 and phase feature data 230 as inputs, and determine outputs indicating whether the magnitude feature data 228 and phase feature data 230 represent movement of an object, a direction of that movement, and/or a number of objects moving.

The time-sequence classification component 226 may further perform various techniques to train the ML model(s) 232. For instance, an ML model(s) 232, such as a neural network, may be trained with training data (e.g., magnitude feature data 228 and phase feature data 230) that is tagged as no movement (or minor movement), and training data tagged as movement (or major movement such as walking). Generally, the training data may comprise feature vectors of magnitudes of reflections of different ultrasonic signals off of objects over a period of time (e.g., windowing and feature stacking to represent the period of time). In this way, the ML model(s) 232 may be trained to identify input feature vector as representing reflections of ultrasonic signals that reflected off a moving object, or that did not reflect off a moving object.

Further, the ML model(s) 232 may additionally be trained to identify the direction of movement of the object through the environment. The microphone(s) 112 may include multiple microphones that generate, or otherwise are used to create, multi-channel feature data for frequency components of the reflection of the ultrasonic signal, such as phase components and phase feature data 230. The ML model(s) 232 may be trained using phase feature data 230 representing the phase components, or phase feature data 230 representing differences between the phase components, from multiple microphones 112. For instance, the ML model(s) 232 may be trained to identify, based on a comparison between phase components representing the reflection of the ultrasonic signal detected by two different microphones 112, a direction of the object as it moves through the environment.

In even further examples, the ML model(s) 232 may be trained to determine a number of people in the environment that are moving. As an example, the microphone(s) 112 in the presence-detection device 104 may include multiple microphones to generate, at least partly using various components of the presence-detection device 104, phase feature data 230, the model(s) 232 may identify, from the differences in phase components for audio signals generated by multiple microphones 112 represented in the phase feature data 230, movement at various angles (in degrees or radians) that indicate multiple objects moving. For example, the phase feature data 230 may indicate that movement is detected at substantially 180 degrees from a defined axis of the array 112, and also at substantially 30 degrees from the defined axis. The ML model(s) 232 may be trained to determine that, if the difference in the angles are large enough, or over a threshold difference, multiple objects must be moving in the environment rather than one large object.

The time-sequence-classification component 226 may further determine classification results data. For example, the time-sequence classification component 226 and/or the ML model(s) 232 may analyze the magnitude feature data 228 and the phase feature data 230 and output confidence scores associated with one or more of (i) detecting movement of an object, (ii) detecting a direction of the movement, and (iii) detecting one or multiple objects moving in the environment of the presence-detection device 104. The time-sequence-classification component 226 may be configured to determine if those confidence scores are above or below threshold values, and also determine actions for the presence-detection device 104 to perform based on the confidence scores being above or below threshold values. Generally, the threshold values may be associated with confidence values that indicate a high-degree, or sufficiently high-degree, of certainty that movement was detected, a direction of the movement, and/or that multiple objects were detected as moving. For instance, if the ML model(s) 232 outputs confidence scores that are higher than an 85% chance that movement was detected, the time-sequence-classification component 226 may confirm or determine that movement was in fact detected and perform various operations. The confidence threshold values may be adjusted as desired, such as to err on various sides of detecting movement, or not detecting movement. For instance, the time-sequence-classification component 226 may have fairly high threshold values in order to prevent the presence-detection device 104 from performing operations in instances where movement was incorrectly identified due to a lower threshold value.

The computer-readable media 204 may further store a mixer component 234 configured to, when executed by the processor(s) 202, determine how to mix audible audio data with ultrasonic signal data. That is, the mixer component 234 may be configured to determine how to mix the different audio data in such a way that saturation is avoided, and/or determine power levels at which to emit the ultrasonic signal 114 and audible audio by using one or more power-level tables 238.

The computer-readable media 204 may further store a calibration component 236 configured to, when executed by the processor(s) 202, determine audio characteristics of an environment of the presence-detection device 104 and/or carrier frequencies at which to output sound by the loudspeaker(s) 110. In some examples, the calibration component 236 may cause the signal-generation component 210 to generate audio data representing a calibration tone, such as an ultrasonic sweep signal, to determine audio characteristics of the environment of the presence-detection device 104. The calibration component 236 may perform device calibration to determine an optimal frequency range for ultrasonic signals to be emitted by the loudspeaker(s) 110 into the environment. In some examples, the calibration component 236 may cause the signal-generation component 210 to generate an ultrasonic sweep signal that, when converted into sound by the loudspeaker(s) 110, emits a sound over a period of time at a range of ultrasonic frequencies (e.g., 27 kHz-42 kHz). The calibration component 236 may also activate at least one microphone in the microphone(s) 112 to generate audio data representing the ultrasonic sweep signal, and determine an optimal frequency range/bin for the environment. For instance, the calibration component 236 may analyze various frequency ranges included in the total frequency range of the ultrasonic sweep signal and determine signal-to-noise (SNR) values for one or more frequency ranges. The calibration component 236 may determine which sub-frequency range in the total frequency range of the ultrasonic sweep signal has the best SNR value.

In some examples, the calibration component 236 may cause utilize the ultrasonic sweep signal upon installation of the presence-detection device 104, after detecting movement, or the end of movement, using a sensor of the presence-detection device 104, and/or periodically in order to determine an optimal frequency at which to emit ultrasonic signals into an environment of the presence-detection device 104.

In some examples, the calibration component 236 may perform more passive techniques for determining acoustic characteristics of an environment of the presence-detection device 104. For instance, the calibration component 236 may, at least periodically, simply utilize at least one microphone in the microphone(s) 112 to generate audio data while the loudspeaker(s) 110 is not outputting sound. The calibration component 236 may analyze that audio data to determine background noise or sound in the environment of the presence-detection device 104. In this way, the calibration component 236 may detect noise that may be caused by other objects in the environment (e.g., television, ceiling fan, vacuum cleaner, etc.) that may interfere with analyzing audio data representing ultrasonic signals. In this way, the calibration component 236 may determine a background noise profile or signature that may later be used to help identify portions of audio data that represent reflections of the ultrasonic signal 122, rather than background noise. The calibration component 236 may provide an indication of a frequency at which to emit ultrasonic signals to the signal-generation component 210 in order to generate audio data/signals that represent the ultrasonic signals when converted by the loudspeaker(s) 110. In this way, the loudspeaker(s) 110 may emit ultrasonic signals that are at a more optimized frequency range based on audio characteristics of the environment.

The computer-readable media 204 may further store an audio-player component configured to, when executed by the processor(s) 202, cause the processor(s) 202 to play audio such as music songs or other audio files. The audio-player component may cause audio data to be provided to the loudspeaker(s) 110 to be converted into sound. In some examples, prior to providing the audio data to the loudspeaker(s) 110, the audio data may be stored in the audio-data buffer 216. In such examples, the mixer component 234 may analyze the audio data stored in the audio-data buffer 216 and determine how to mix the audio data, such as music data, with audio data representing the ultrasonic signal such that the output sound does not experience saturation.

The presence-detection device 104 may comprise any type of portable and/or fixed device and include one or more input devices 240 and output devices 242. The input devices 240 may include a keyboard, keypad, lights, mouse, touch screen, joystick, control buttons, etc. The output devices 242 may include a display, a light element (e.g., LED), a vibrator to create haptic sensations, or the like. In some implementations, one or more loudspeakers 110 may function as output devices 242 to output audio sounds.

The presence-detection device 104 may have one or more network interfaces 244 such as a wireless or Wi-Fi network communications interface, an Ethernet communications interface, a cellular network communications interface, a Bluetooth communications interface, etc., for communications over various types of networks, including wide-area network, local-area networks, private networks, public networks etc. In the case of a wireless communications interfaces, such interfaces may include radio transceivers and associated control circuits and logic for implementing appropriate communication protocols. The network interface(s) 244 may enable communications between the presence-detection device 104 and the secondary devices 108, as well as other networked devices. Such network interface(s) can include one or more network interface controllers (NICs) or other types of transceiver devices to send and receive communications over a network.

For instance, the network interface(s) 244 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 244 may include a wide area network (WAN) component to enable communication over a wide area network. The networks may represent an array of wired networks, wireless networks, such as WiFi, or combinations thereof.

Figure 3:
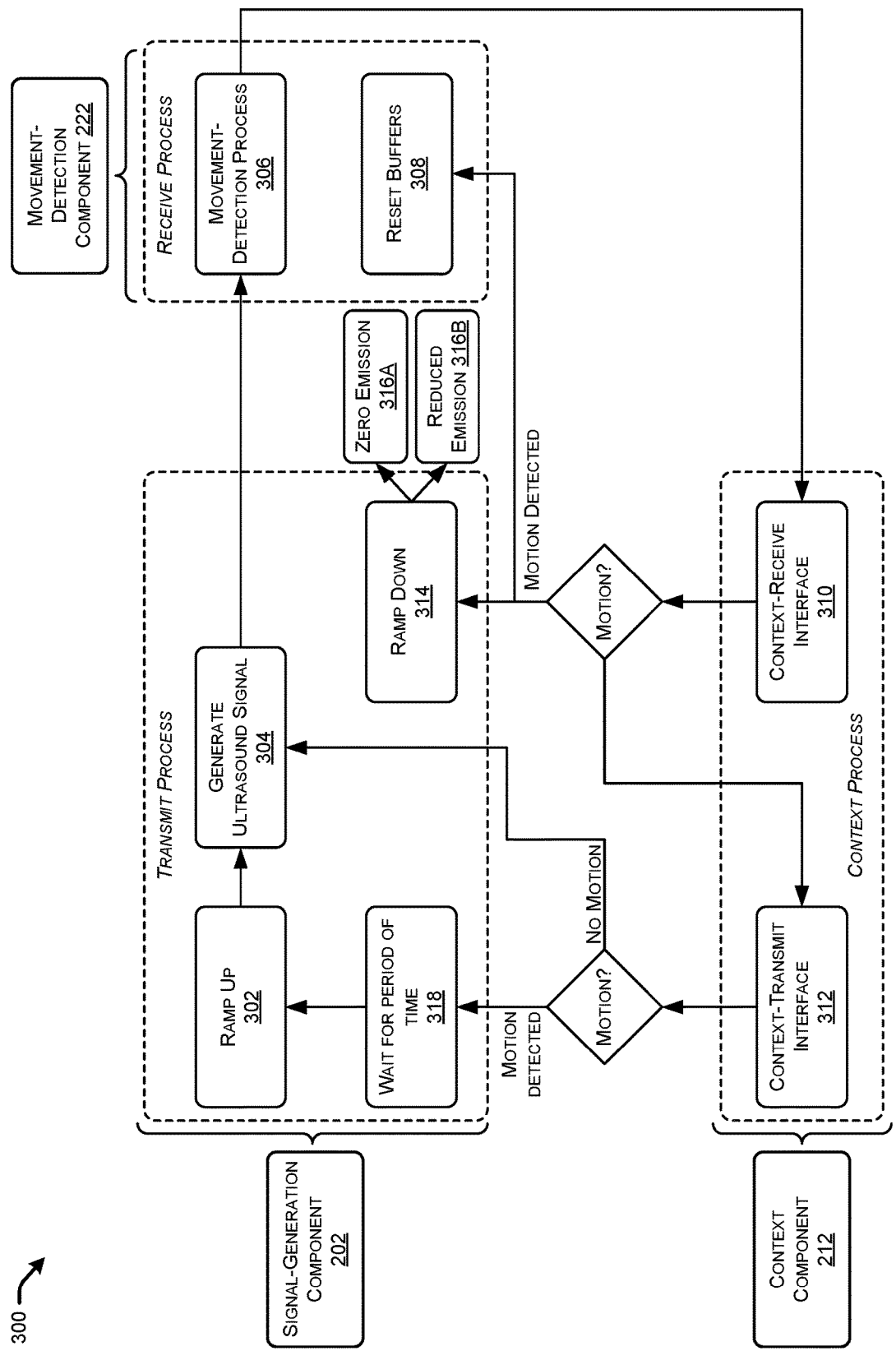
FIG. 3 illustrates an example high-level process for a presence-detection device to reduce ultrasonic emissions while performing presence detection in an environment using ultrasonic signals.

FIG. 3 illustrates an example high-level process 300 for a presence-detection device 104 to reduce ultrasonic emissions while performing presence detection in an environment 102 using ultrasonic signals 114. As illustrated, the process 300 may include a transmit process that is orchestrated at least partly by the signal-generation component 202, a receive process that is orchestrated at least partly by the movement-detection component 222, and a context process that is orchestrated at least partly by the context component 212.

At 302, the signal-generation component 202 may generate a ramp up signal that ramps up the emission power of an ultrasonic signal from a low-power emission level, such as zero decibels (dB), to an operating-power emission level (e.g., 100 dB SPL emission level, 90 dB SPL emission level, etc.). The ultrasonic signal 114 may be ramped up by the signal-generation component 202 until it reaches the operating emission level, which may in some instances reduce audible artifacts caused by the presence-detection device 104 when emitting ultrasonic signals 114.

At 304, the signal-generation component 202 may generate an ultrasonic signal at the operating power emission level, and cause the loudspeaker 110 to emit the ultrasonic signal 114 at a calibrated carrier frequency into the environment 102.

At 306, the movement-detection component 222 may perform a movement-detection process to determine whether or not there is movement in the environment 102 of the presence-detection device 104. For instance, the feature-extraction component 224 may extract magnitude feature data 228 and/or phase feature data 230 from audio data that represents reflected ultrasonic signals 112. The time-sequence classification component 226 may then analyze the magnitude feature data 228 and/or phase feature data 230 to determine whether the reflected ultrasonic signals 112 indicate a shift in the frequency caused by movement 122.

The context component 212 may include a context-receive interface 310 that is configured to receive input from the movement-detection process 306 indicating whether or not motion or movement is detected. Generally, the context component 212 may provide interfaces that allow the transmit process and components to communicate with the receive process and components. As illustrated, if the context-receive interface 310 receives input indicating motion, then the context component 212 may reset buffers at 308 and disable the receive process. That may include shutting down the microphone(s) 112, refraining from storing audio data 220 in the audio-data buffer 216, and/or other techniques for disabling the receive process until the next time it has to detect movement. Further, the context-receive interface 310 may cause the transmit process to ramp down at 314, which may include shutting down the loudspeaker 110, causing the signal-generation component 202 to refrain from generating the ultrasound signal 114, and/or other techniques for ramping down the transmit process. In some instances, the presence-detection device 104 may ramp down to zero emission 316 where ultrasonic emissions are stopped, or the reduced emission 316B where ultrasonic emissions are reduced to a lower power level.

The context-receive interface 310 may further provide a context-transmit interface 312 with an indication that there was no motion detected. The context-transmit interface 312 may provide the receive process an interface by which to communicate with the transmit process. The context-transmit interface 312 may, in response to receiving input indicating no motion, continue to allow or instruct the signal-generation component 202 to generate the ultrasound signal at 304.

Conversely, if the context-receive interface 310 receives input indicating that there is motion, the context-receive interface 310 may provide the context-transmit interface 312 with an indication that motion was detected. The context-transmit interface 312 may, in response to receiving input indicating that there is motion, reduce ultrasonic emission and wait for a configurable period of time 318. In some instances, reducing emission of the ultrasonic signals 114 may be performed according to the zero-emission process described herein, the reduced-emission process described herein, and/or any other reduced-emission process. The period of time that the presence-detection device 104 waits for may be predefined, and in some instances the period of time may be configurable. For instance, if the presence-detection device 104 have been frequently detection movement, the presence-detection device 104 may increase the period of time during which ultrasonic emissions are stopped or reduced, such as according to a Fibonacci sequence (e.g., 15 seconds, 30 seconds, 45 seconds, 75 seconds, 120 seconds, etc.). As an example, once motion is detected ultrasonic emission is disabled or reduced (polling state) for a duration of 30 seconds. After coming out of the polling state where ultrasonic signals are being emitted, if motion is detected within 20 seconds, then ultrasound is disabled or reduced for 60 seconds. Further, after coming out of the 60 second polling interval, if motion is detected within 60 seconds, then ultrasonic emission may be disabled or reduced for 90 seconds. This is an example of modifying the polling and/or emission periods according to the Fibonacci sequence durations.

Various other polling schemes may be used besides the Fibonacci sequence, such as exponential schemes. As an example, an exponential scheme may be used where successive polling intervals are the previous interval times 2, resulting in a polling scheme having polling durations of 15 seconds, 30 seconds, 60 seconds, 120 seconds, 240 seconds, etc. However, any other scheme may be used to adjust polling intervals and emission intervals.

After the period of time has elapsed, the signal-generation component 202 may ramp up 302 the transmit process for another ultrasonic signal 114 and continue through the process 300.

FIG. 4A illustrates an example diagram 400 of a polled-emission status as well as a continuous-emission status for a presence-detection device 104 to perform presence detection using different techniques.

The diagram 400 includes a graph that has an indication of the presence-detection status 402 on the y-axis, and an indication of time 404 on the x-axis. The presence-detection status 402 is a "0" when the presence-detection device 104 has not detected motion, and a "1" when the presence-detection status 402 has detected motion. As shown, the presence-detection device 104 is emitting an ultrasonic signal 114 and no movement is detected until around 18 seconds.

The diagram 400 shows the status of two presence-detection techniques, specifically, a continuous-emission status 406 where an ultrasonic signal 114 is continuously emitted into an environment 102, and a polled-emission status 408 where the ultrasonic signal 114 is polled according to the techniques described herein. The polled-emission status 408 generally represents a presence-detection device 104 that stops, or reduces, emitting an ultrasonic signal 114 after detecting motion.

As illustrated, at around 18 seconds, the continuous-emission status 406 and polled-emission status 408 may each detect presence (e.g., motion or movement) and both move from "0" to "1." Further, at around 24 seconds, the continuous-emission status 406 may change from "1" to "0" which indicates that the presence-detection technique using continuous ultrasonic emission has determined that there is no longer movement. However, the polled-emission status 408 may still be at "1" due to the ultrasonic signal emission being reduced or stopped according to the techniques described herein. As shown, the continuous-emission status 406 indicates that movement is detected several times over the period of time that the polled-emission status 408 has been deactivated or shut off.

However, at around 35 seconds, the presence detection techniques corresponding to the polled-emission status 408 indicate that the period of time has elapsed, and the movement status has moved back to "0." Accordingly, at around 38 seconds, movement is detected by both techniques and the continuous-emission status 406 as well as the polled-emission status 408 both move to "1" indicating that movement was detected. The ultrasonic signals used for the polled-emission status 408 are then shut off or reduced for the period of time after detecting motion or presence.

FIG. 4B illustrates an example diagram 410 of a polled-emission signal as well as a continuous-emission signal when a presence-detection device 104 performs presence detection using different techniques. Generally, the timing and operations shown in the diagram 410 correspond to the timing and operations of diagram 400.

The diagram 410 includes a graph that has an indication of a signal-detection status 412 on the y-axis, and an indication of time 414 on the x-axis. The presence-detection status 412 is a "0" when a presence-detection device 104 is not emitting an ultrasonic signal 114, and a "1" when a presence-detection device 104 is emitting an ultrasonic signal 114. As illustrated, a polled-emission signal 416 and a continuous-emission signal 418 are both at status "1" which indicates that both are emitting ultrasonic signals 114.

At around 18 seconds, the polled-emission signal 416 may lower to "0" for a period of time in response to detecting presence or movement (e.g., stop or reduce ultrasonic emission), but the continuous-emission signal 418 may continue to stay at "1" indicating that ultrasonic emission continues for the continuous-emission technique.

Around 35 seconds, once the period of time has elapsed, the polled-emission signal 416 may move back to "1" indicating that ultrasonic emission for motion detection has begun again (e.g., after a ramp up). Both signals may indicate that ultrasonic-presence detection is being performed until around 38 seconds when movement occurs. Again, once movement is detected, the polled-emission signal 416 may be reduced to "0" which indicates that ultrasonic-signal emission has been reduced or shut off in response to detecting movement.

Figure 5:
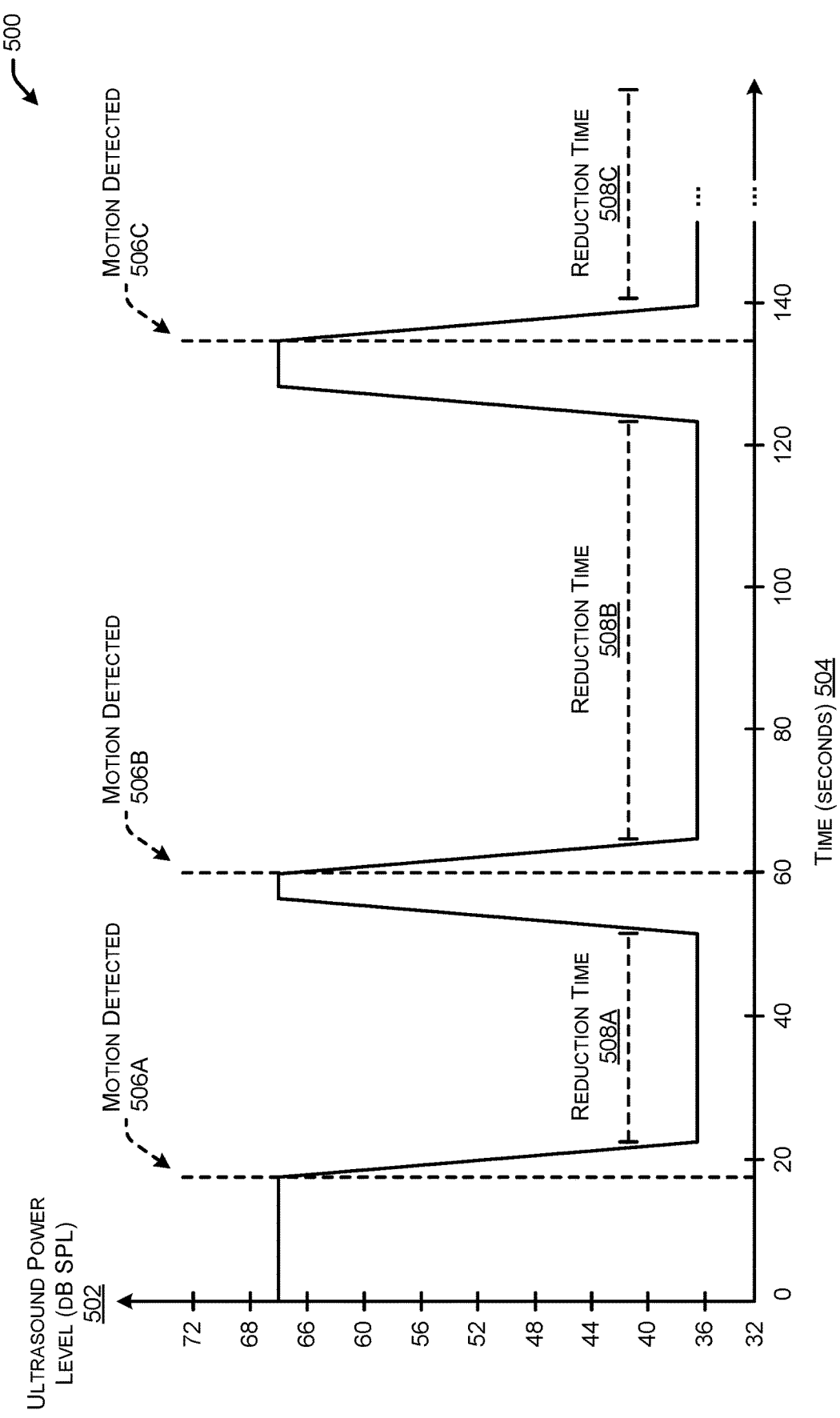
FIG. 5 illustrates an example diagram depicting techniques for a presence-detection device to reduce the emission level of ultrasonic signals while performing presence-detection techniques.

FIG. 5 illustrates an example diagram 500 depicting techniques for a presence-detection device 104 to reduce the emission level of ultrasonic signals 114 while performing presence-detection techniques.

As illustrated, the diagram 500 has an indication of ultrasound power level 502 on the y-axis in dB SPL, and time 504 on the x-axis in seconds. The diagram 500 illustrates points in time where motion is detected 506A-506C, and indications of how the emission power of an ultrasonic signal 114 reduced for reduction times 508A-508C according to the reduced-emission process described herein. As shown, each time motion is detected 506 by a presence-detection device 104 using an ultrasonic signal 114, the emission power of the ultrasonic signal 114 may be reduced to around 67 dB SPL down to around 36 dB SPL. The emission power of the ultrasonic signal 114 may be reduced for a predefined, but configurable, reduction time 508A (e.g., around 15 seconds in this example). However, this example is merely illustrative, and any other values in terms of emission powers and reduction time 508A may be used.

After the reduction time 508A, the ultrasonic signal emission may ramp back up to roughly 67 dB SPL for movement detection. At 506B, the presence-detection device 104 may detect motion using the ultrasonic signal 114 and ramp down emission to 36 dB SPL for a reduction time of 508B. As shown, the reduction time 508B may be longer than the reduction time 508A in this example. For instance, the presence-detection device 104 may determine that because motion was detected at 506A, and then again at 506B, it is likely there is continuous movement in the environment 102. In light of this, the presence-detection device 104 may determine that a longer reduction time 508B may be appropriate as it is likely movement will again be detected once emission is resumed. In some instances, the reduction time 508B may be increased if motion is detected within a threshold period of time from when emission of the ultrasonic signal 114 returns to normal operating power (e.g., within 3 seconds, within 5 seconds, within 30 seconds, etc.).

Figure 6:
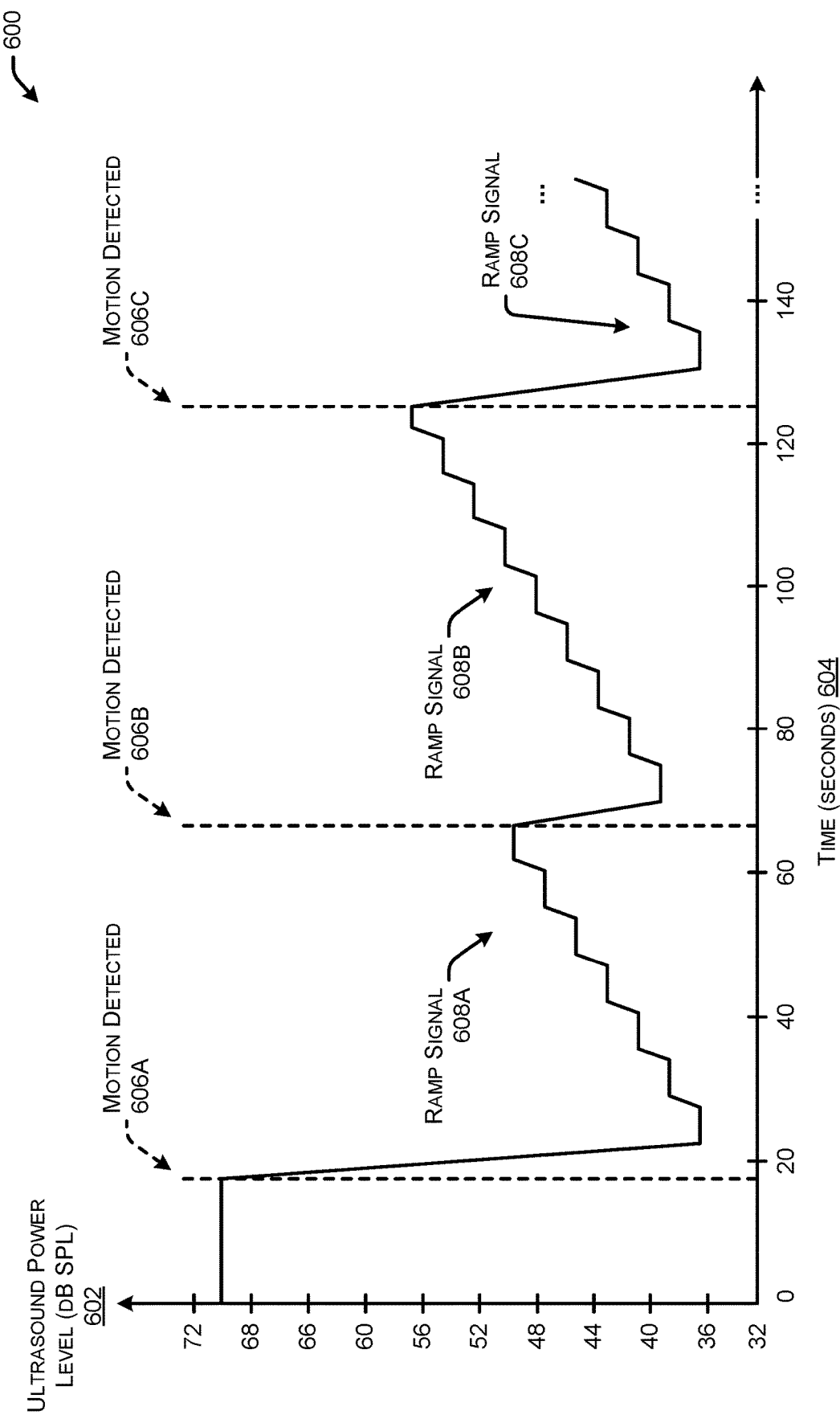
FIG. 6 illustrates another example diagram depicting techniques for a presence-detection device to reduce the emission level of ultrasonic signals while performing presence-detection techniques by using a ramp signal.

FIG. 6 illustrates another example diagram 600 depicting techniques for a presence-detection device 104 to reduce the emission level of ultrasonic signals 114 while performing presence-detection techniques by using a ramp signal.

As illustrated, the diagram 600 has an indication of ultrasound power level 602 on the y-axis in dB SPL, and time 604 on the x-axis in seconds. The diagram 600 illustrates points in time where motion is detected 606A-606C, and indications of how the emission power of an ultrasonic signal 114 reduced upon detecting motion to a lower-end emission power (e.g., 36 dB SPL in this example), and is ramped up, or gradually increased, until motion is detected. The diagram 600 represents a ramp signal 608 that is utilized according to the adaptive-emission process described herein in order to reduce ultrasonic emissions. The presence-detection device 104 may, upon detecting motion 606, begin emitting the ultrasonic ramp signals 608 that gradually increase from a relatively low emission power level towards the higher/normal emission power level used in normal operation. The presence-detection device 104 may analyze the reflections of the ultrasonic ramp signals 608 as they increase in emission power to determine if the reflections represent motion. Upon detecting motion, the presence-detection device 104 may either stop emitting ultrasonic signals for a period of time, reduce the emission power of the signals for a period of time, and/or begin emitting another ultrasonic ramp signal 608. Thus, the ultrasonic ramp signals 608 may be emitted at relatively low emission power, and continue to increase in emission power until the necessary amount of power is used to detect movement (or lack of movement in the room). In this way, the presence-detection device 104 may still be able to detect motion and take appropriate actions, but may also reduce the average power at which ultrasonic signals are emitted.

As illustrated, motion is detected at 606A, and emission of the ultrasonic signal 114 may be reduced (e.g., ramped down) from 67 dB to 36 dB. The presence-detection device 104 may then begin emitting the ramp signal 608A until motion is again detected at 606B. as illustrated, the motion is detected at 606B at roughly 48 dB SPL. Accordingly, the presence-detection device 104 may only reduced the emission level to roughly 40 dB and begin emitting the ramp signal 608B. In some instances, the ramp signal 608B may be increased over a longer period of time and/or take longer periods of time to ramp up due to motion being detected so quickly using the ramp signal 608A.

Figure 7:
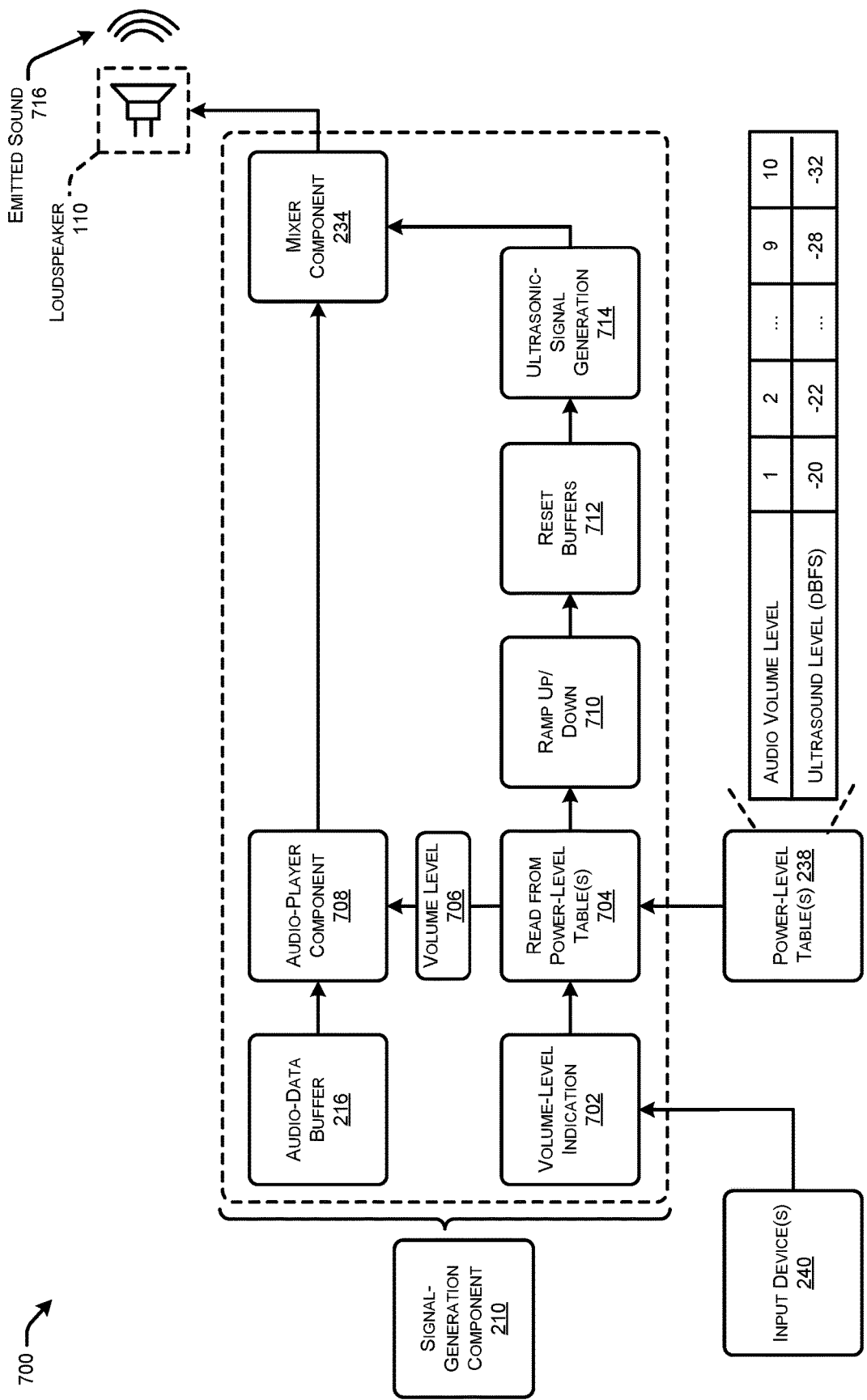
FIG. 7 illustrates an example process for determining power levels at which to concurrently emit an ultrasonic signal and audible audio using a loudspeaker in order to ensure that the presence-detection device can detect motion.

FIG. 7 illustrates an example process 700 for determining power levels at which to concurrently emit an ultrasonic signal 114 and audible audio using a loudspeaker 110 in order to ensure that the presence-detection device 104 can detect motion.

In some examples, the signal-generation component 210 may analyze audio data stored in the audio-data buffer 216, such as music data. For example, the presence-detection device 104 may buffer music data in the audio-data buffer 216 prior to causing the loudspeaker(s) 110 to convert the music data into audible sound. Further, an audio-player component 710 may receive a volume-level indication 702 via an input device 240 (e.g., voice command, volume knob, touch screen, etc.). The volume-level indication 702 may indicate a power-level, or volume level, at which the audible sound is to be output by the loudspeaker 110.

The signal-generation component 210 may perform, at 704, one or more reads from the power-level table(s) 238 using the volume-level indication 702 to determine a power level at which to emit the ultrasonic signal 114. That is, the signal-generation component 210 may query or search the one or more power-level tables 238 to determine a power level at which to emit the ultrasonic signal 114. The power-level tables 238 may indicate, for different audio volume levels, corresponding ultrasound levels (e.g., in dBFS) at which to emit the ultrasonic signal 114 to ensure that ultrasonic-presence detection techniques are able to be performed while concurrently outputting audible sound. At 706, the volume level for the audible sound may be provided to the audio-player component 708. At 710, the signal-generation component 210 may cause the ultrasonic signal 114 to at least one of ramp up or ramp down (e.g., ramp up if audible music is increasing in volume or ramp down if audible music is decreasing in volume). At 712, the signal-generation component 210 may reset the audio-data buffer(s) 216 (e.g., clear the buffers 216, remove data from buffers 216, etc.). In this way, the audio-data buffers 216 may store audio data representing ultrasonic signals that are emitted at a consistent power level.

At 714, the signal-generation component 210 may generate the ultrasonic signal, and the mixer component 234 may mix the audio data representing the ultrasonic signal into the portion of the music data such that saturation and/or clipping is avoided when the resulting mixed audio data is converted into emitted sound 716 by the loudspeaker 110.

Figure 8:
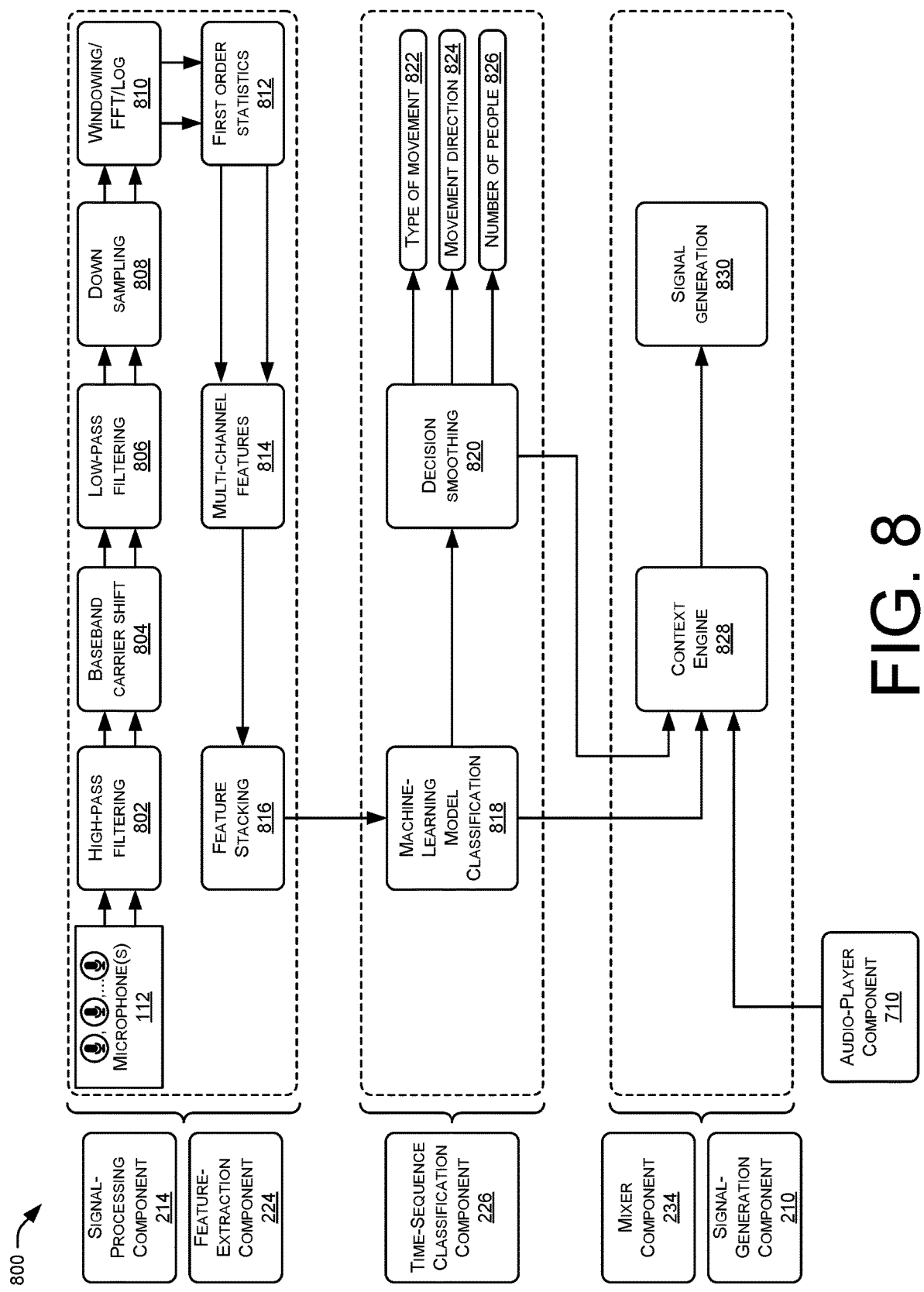
FIG. 8 illustrates an example high-level process for generating and emitting an ultrasonic signal into an environment, and analyzing audio data representing reflections of the ultrasonic signal off objects in the environment to detect presence of a user.

FIG. 8 illustrates an example high-level process 800 for generating and emitting an ultrasonic signal into an environment, and analyzing audio data representing reflections of the ultrasonic signal off objects in the environment to detect presence or a user.

At illustrated, at least two microphones 112 in a microphone array may generate multi-channel audio data. The signal-processing component 214 may perform high-pass filtering on the multi-channel audio data at 802 to remove audio data in unwanted frequencies, baseband carrier shift at 804 to modulate the audio signal back to baseband frequency from carrier frequency, perform low-pass filtering on the multi-channel audio data at 806 to remove audio data in unwanted frequencies, and perform down sampling on the multi-channel audio data streams at 808 to produce an approximation or representation of the audio signals generated by the microphone(s) 112, but at a lower frequency rate. The signal-processing component 214 may, at 810, then perform windowing, fast Fourier transforms, and logarithmic transforms on the audio data at 810 to generate magnitude feature data 228 and phase feature data 230.

The feature-extraction component 224 may identify the first order statistics of the magnitude and frequency components in the magnitude feature data 228 and phase feature data 230, and generate multi-channel features at 814. For example, the feature-extraction component 224 may select magnitude feature data 228 from one of the multi-channel audio streams, and also determine phase feature data 230 that represents differences in phase components between phase components for two audio streams from two microphones 112.

At 816, the feature-extraction component 224 may perform feature stacking using the magnitude feature data 228 and phase feature data 230 to generate binned audio feature data over time. For example, the magnitude feature data 228 may comprise a 1-dimensional vector, and the phase differences between phase components be also be a 1-dimensional array representing audio data streams over a period of time that represent the ultrasonic signal reflected off objects in the environment.

At 818, the time-sequence classification component 226 may perform machine-learning model classification. For instance, the time-sequence classification component 226 may input the magnitude feature data 228 and phase feature data 230 received from the feature stacking at 818 in the ML model(s) 232. The ML model(s) 232 may output binary answers (e.g., "1" or "0," "yes" or "no<," etc.) and/or probability scores that indicate one or more of (i) motion of a person, (ii) a direction of the motion of the person, or (iii) a number of people in the room. At 820, the time-sequence classification component 226 may perform decision smooth to ensure that the ML model(s) 232 did not output a false positive. For example, the time-sequence classification component 226 may perform similar techniques using the ML model(s) 232 for a subsequent period of time that at least partly overlaps with the period of time for which audio data that was just analyzed. If the audio data representing the ultrasonic signal for the partly overlapping period of time also indicates the same answer regarding movement, direction of movement, and/or number of people, the time-sequence classification component 226 may determine that there was not a false positive (and determine there was a false positive if not).

The time-sequence classification component 226 may then output at least one of a type of movement at 822 (e.g., no movement, minor movement, major movement, etc.), a movement direction 824 relative to the presence-detection device 104, and/or a number of people 826 in the environment. In some examples, the time-sequence classification component 226 may determine that the objects moving are people based at least in part on a line-of-sight of the presence-detection device 104 (or the loudspeaker(s) 110 and/or microphone(s) 112).

In some examples, inputs may be provided to a context engine 828 in order to drive the signal-generation component 210 to perform signal generation at 830. For example, the context engine 828 may provide input into the signal-generation component 210 indicating an optimized signal frequency, how to mix the audio data representing the ultrasonic signal with other audio data that is provided to the loudspeaker(s) 110 to be converted into sound, an indication of a type of ultrasonic signal to emit (e.g., continuous, periodic, etc.) and/or other data.

Figure 9:
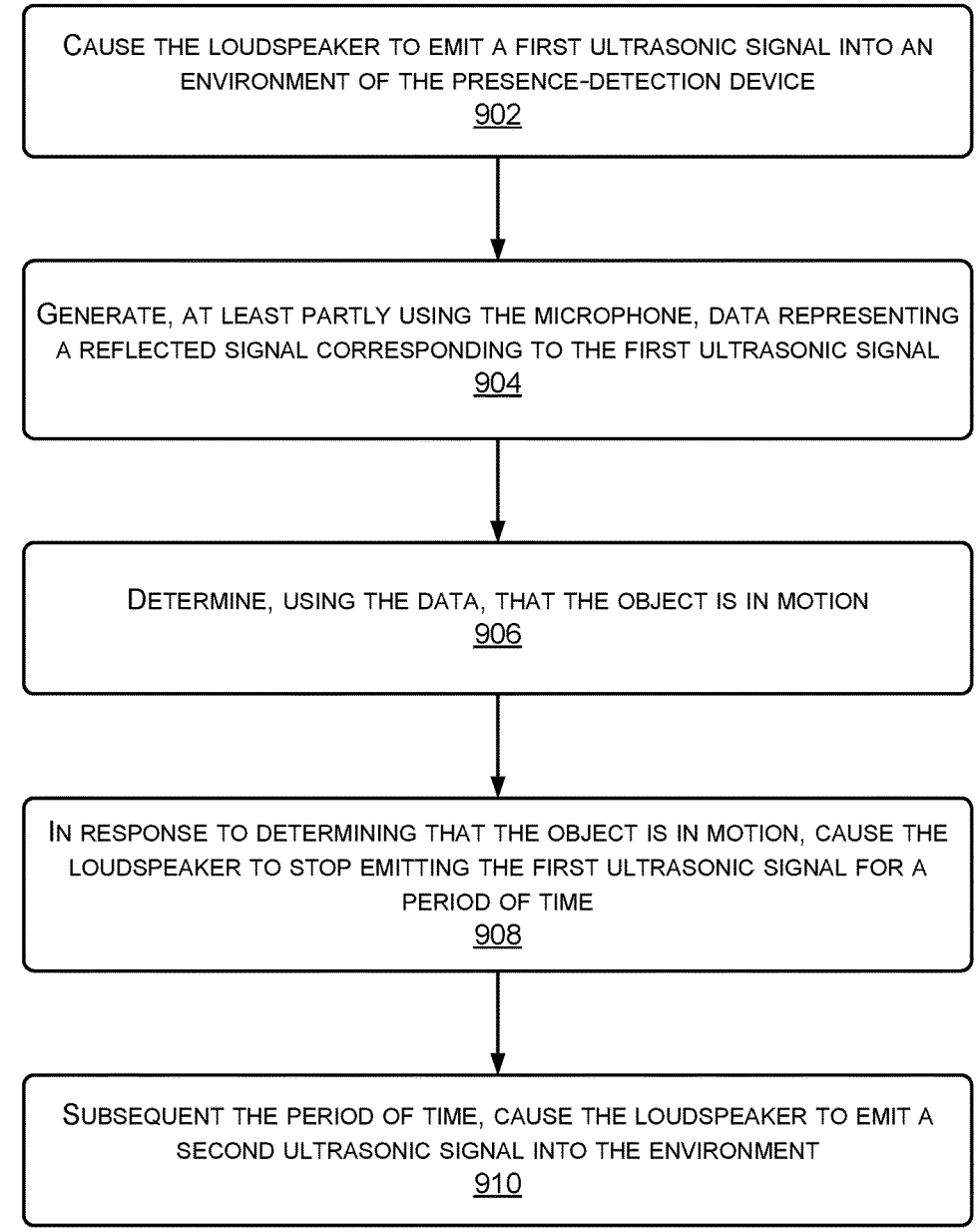
FIG. 9 illustrates a flow diagram of an example process for a presence-detection device to emit ultrasonic signals to detect motion, and upon detecting motion, refraining from emitting the ultrasonic signals for a period of time.
Figure 10:
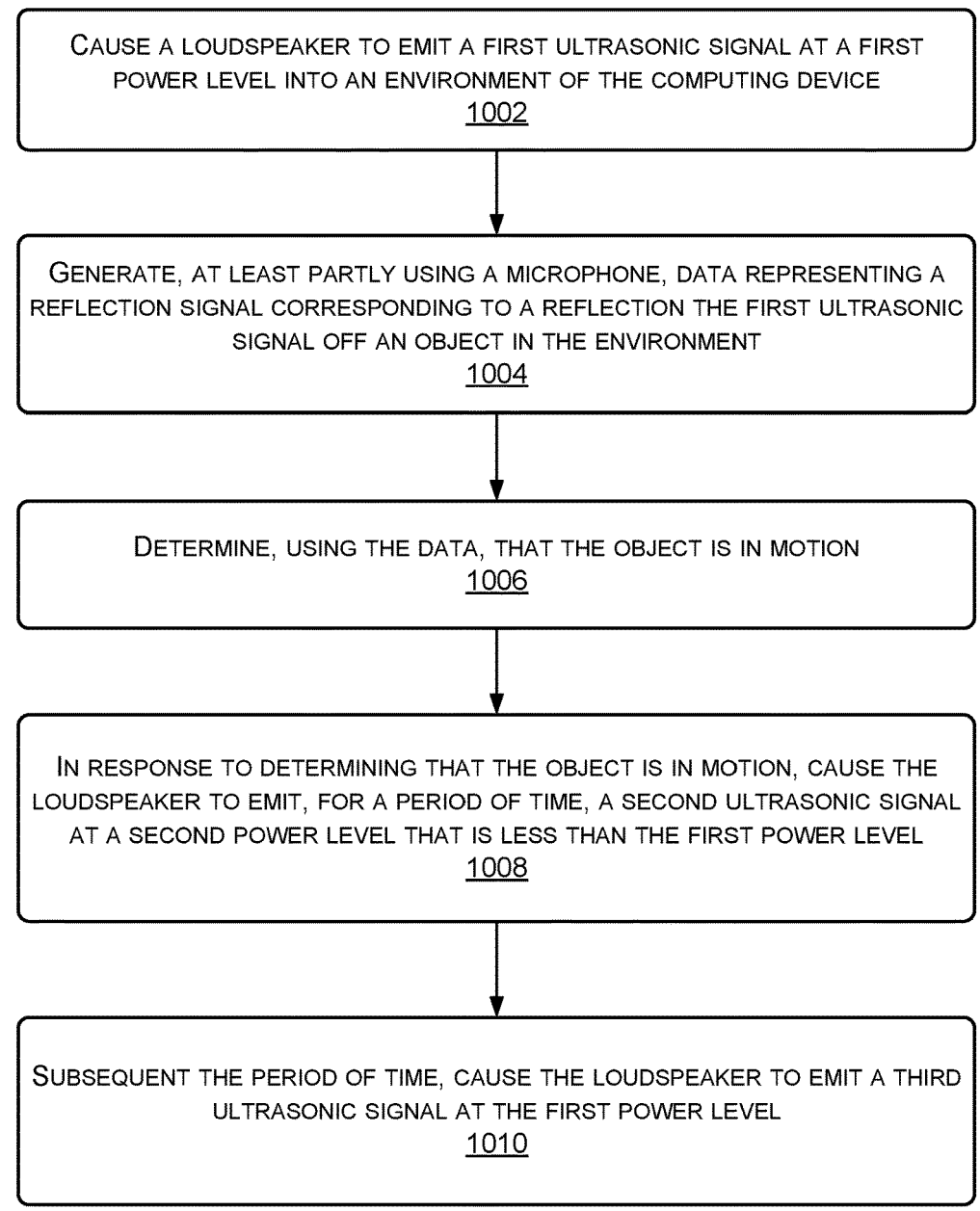
FIG. 10 illustrates a flow diagram of an example process for a presence-detection device to emit ultrasonic signals to detect motion, and upon detecting motion, reduce the emission level of the ultrasonic signals for a period of time.
Figure 11:
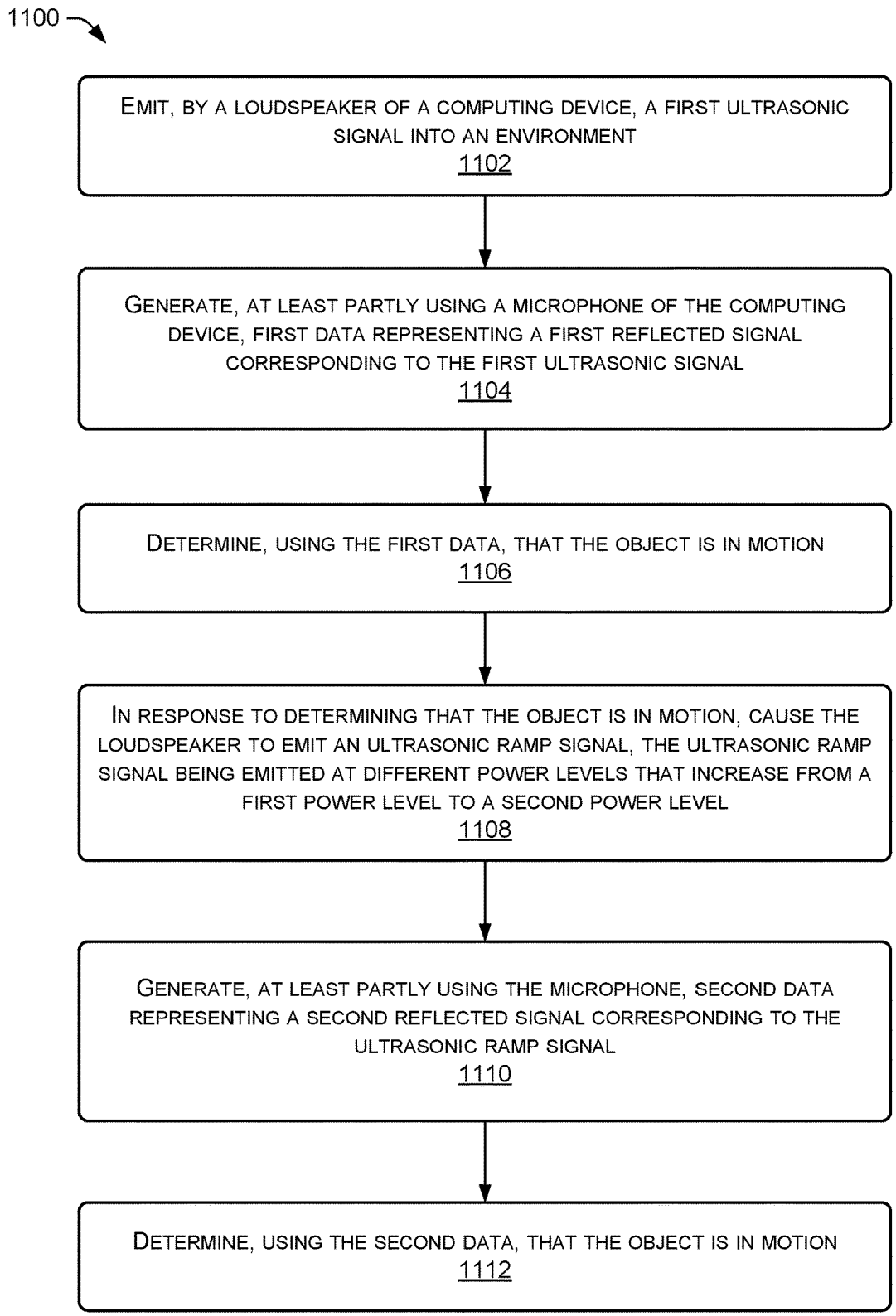
FIG. 11 illustrates a flow diagram of an example process for a presence-detection device to emit ultrasonic signals to detect motion, and upon detecting motion, using an ultrasonic ramp signal that gradually increases in power to detect motion.

FIGS. 9-11 illustrate flow diagrams of example processes/methods 900, 1000, and 1100. These processes (as well as each process or method described herein,) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 9 illustrates a flow diagram of an example process 900 for a presence-detection device 104 to emit ultrasonic signals to detect motion, and upon detecting motion, refraining from emitting the ultrasonic signals for a period of time.

At 902, the presence-detection device 104 may cause a loudspeaker 110 to emit a first ultrasonic signal 114 into an environment 102 of the presence-detection device 104. In some instances, the presence-detection device 104 may cause the loudspeaker 110 to increase emission of the first ultrasonic signal 114 from a first power level to a second power level (e.g., ramp up the signal), and in response to the first ultrasonic signal 114 being emitted at the second power level, receiving the reflection signal at the microphone 112 (e.g., activating the microphone 112 once the signal has ramped up, storing data in the buffer once the signal has ramped up, etc.).

At 904, the presence-detection device 104 may generate, at least partly using the microphone 112, data representing a reflection signal corresponding to a reflection the first ultrasonic signal off an object in the environment. For instance, the data may be audio data 220 stored in the audio-data buffer 216, and/or magnitude feature data 228 and/or phrase feature data 230.

At 906, the presence-detection device 104 may determine, using the data, that the object is in motion. At 908, the presence-detection device 104 may in response to determining that the object is in motion, causing the loudspeaker to stop emitting the first ultrasonic signal for a period of time. At 910, the presence-detection device 104 may, subsequent the period of time, causing the loudspeaker to emit a second ultrasonic signal into the environment.

FIG. 10 illustrates a flow diagram of an example process 1000 for a presence-detection device 104 to emit ultrasonic signals to detect motion, and upon detecting motion, reduce the emission level of the ultrasonic signals 114 for a period of time. At 1002, the presence-detection device 104 may cause the loudspeaker to emit a first ultrasonic signal at a first power level into an environment of the computing device. For instance, the first ultrasonic signal may be emitted at 68 dB SPL (or any other value usable to detect movement 120) into the environment 102 of the presence-detection device 104.

At 1004, the presence-detection device 104 may generate, at least partly using the microphone, data representing a reflected signal corresponding to the first ultrasonic signal. For instance, the microphone 112 may receive a reflected signal corresponding to the first ultrasonic signal 114 where the reflected signal originated at an object in the environment 102. Further, the signal-processing component 214 may generate data representing the reflected signal, such as feature data.

At 1006, the presence-detection device 104 may determine, using the data, that the object is in motion. For instance, the movement-detection component 222 may identify movement using at least one of magnitude feature data 228 and/or phase feature data 230.

At 1008, the presence-detection device 104 may, in response to determining that the object is in motion, cause the loudspeaker to emit, for a period of time, a second ultrasonic signal at a second power level that is less than the first power level. For instance, the loudspeaker 110 may stop or reduce the first ultrasonic signal to a lower power level (e.g., 36 dB SPL) for a period of time, or a reduction time 508. In some instances, the reduction time 508 may be dynamically determined based on a sequence of movement detection events. For instance, the period of time may be increased if movement has consistently been detected using previous ultrasonic signals, and the period of time may be increased if movement is not detected very frequently or often using previous ultrasonic signals.

At 1010, the presence-detection device 104 may, subsequent the period of time, cause the loudspeaker to emit a third ultrasonic signal at the first power level into the environment, the third power level being greater than the second power level. For instance, the presence-detection device 104 may begin emitting the ultrasonic signal 114 at a normal operating power level for detecting movement.

FIG. 11 illustrates a flow diagram of an example process 1100 for a presence-detection device 104 to emit ultrasonic signals 114 to detect motion, and upon detecting motion, using an ultrasonic ramp signal that gradually increases in power to detect motion.

At 1102, the presence-detection device 104 may emit, by a loudspeaker of a computing device, a first ultrasonic signal into an environment. For instance, the presence-detection device 104 may emit, using the loudspeaker 110, a first ultrasonic signal 114 into a user environment 102.

At 1104, the presence-detection device 104 may generate, at least partly using a microphone of the computing device, first data representing a first reflection signal corresponding to a first reflection the first ultrasonic signal off an object in the environment. The presence-detection device 104 may use a microphone 112 to receive a first reflected signal corresponding to the first ultrasonic signal 114 where the first reflected signal 122 originated at an object in the environment 102. Further, the presence-detection device 104 may generate first data (e.g., feature data) representing the reflected signal.

At 1106, the presence-detection device 104 may determine, using the first data, that the object is in motion. For instance, the movement-detection component 222 may identify movement using at least one of magnitude feature data 228 and/or phase feature data 230.

At 1108, the presence-detection device 104 may, in response to determining that the object is in motion, cause the loudspeaker to emit an ultrasonic ramp signal, the ultrasonic ramp signal being emitted at different power levels that increase from a first power level to a second power level. At 1110, the presence-detection device 104 may generate, at least partly using the microphone, second data representing a second reflection signal corresponding to a second reflection of the ultrasonic ramp signal, at a third power level, off the object in the environment. At 1112, the presence-detection device 104 may determine, using the second data, that the object is in motion. For instance, the movement-detection component 222 may identify movement using at least one of magnitude feature data 228 and/or phase feature data 230.

Figure 12:
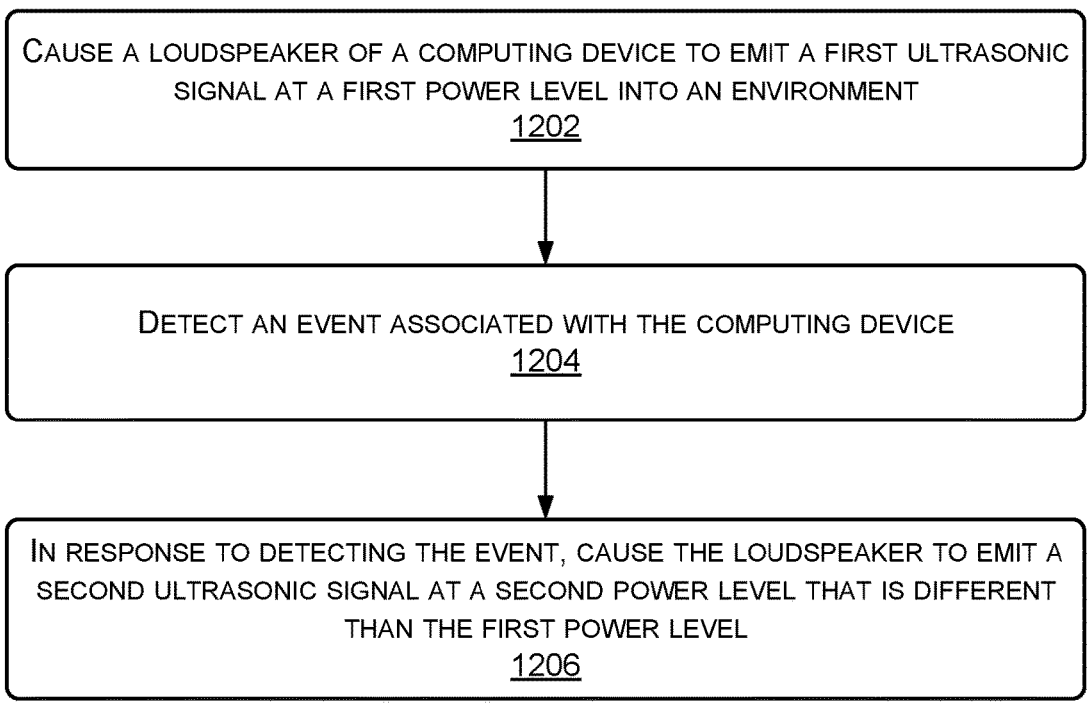
FIG. 12 illustrates a flow diagram of an example process for a presence-detection device to emit ultrasonic signals, detect an event, and alter a power level at which the ultrasonic signals are emitted based on the event.

FIG. 12 illustrates a flow diagram of an example process 1200 for a presence-detection device 104 to emit ultrasonic signals 114, detect an event, and alter a power level at which the ultrasonic signals are emitted based on the event.

At 1202, the presence-detection device 104 may cause a loudspeaker 110 to emit ultrasonic signals 114 at a first power level into an environment 102. In some instances, the ultrasonic signals 114 may be emitted concurrently with audible sound or signals, such as music, machine speech, and/or other audible signals.

At 1204, the presence-detection device 104 may detect an event associated with the device. For instance, the presence-detection device 104 may detect input indicating a command to change a volume level at which the audible sound is being emitted (e.g., turn up the volume, turn down the volume, pause the audible sound, etc.). In some instances, the event may be detecting motion using reflected signals that correspond to the first ultrasonic signal (e.g., bounced off a moving object in the environment 102.

At 1206, the presence-detection device 104 may, in response to detecting the event, cause the loudspeaker 110 to emit a second ultrasonic signal at a second power level that is different than the first power level. In instances where the event is increasing the volume of the audible signals/sound, the presence-detection device 104 may increase the power at which the ultrasonic signals 114 are emitted (e.g., a lookup from a power table). Similarly, in instances where the event is decreasing the volume of the audible signals/sound, the presence-detection device 104 may decrease the power at which the ultrasonic signals 114 are emitted (e.g., a lookup from the power table). In instances where movement is detected as the event, the presence-detection device 104 may reduce the power level at which the ultrasonic signals 114 are emitted to zero or a lower power level.

As used herein, a processor, such as processor(s) 202 may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 202 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 202 may possess its own local memory, which also may store program components, program data, and/or one or more operating systems.

As described herein, computer-readable media and/or memory 204 may include volatile and nonvolatile memory, removable and non-removable media implemented in any method or technology for storage of information, such as computer-readable instructions, data structures, program component, or other data. Such computer-readable media and/or memory 204 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 202 to execute instructions stored on the computer-readable media and/or memory 204. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 202.

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media and/or memory 204, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the Free-BSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 244 may enable communications between the presence-detection device 104 and other networked devices. Such network interface(s) 244 can include one or more network interface controllers (NICs) or other types of transceiver devices to send and receive communications over a network.

For instance, the network interface(s) 244 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, the network interface(s) 244 may include a wide area network (WAN) component to enable communication over a wide area network. The networks that the presence-detection device 104 may communicate over may represent an array of wired networks, wireless networks, such as WiFi, or combinations thereof.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A presence-detection device comprising:
a loudspeaker;
a microphone;
one or more processors; and
one or more computer-readable media storing computer-executable instructions that, when executed by the one or more processors, cause the one or more processors to perform operations comprising:
causing the loudspeaker to emit a first ultrasonic signal into an environment of the presence-detection device;
receiving a reflected signal corresponding to the first ultrasonic signal, the reflected signal originating at an object in the environment;
determining, based on the reflected signal, that the object is in motion;
causing the loudspeaker to at least one of: stop emitting the first ultrasonic signal or emit the first ultrasonic signal at a reduced power level for a first period of time;
subsequent to the first period of time, causing the loudspeaker to emit a second ultrasonic signal into the environment;
receiving a second reflected signal corresponding to the second ultrasonic signal;
determining, based on the second reflected signal, that the object is in motion; and
causing the loudspeaker to continue at least one of: stop emitting the first ultrasonic signal or emit the second ultrasonic signal at the reduced power level for a second period of time.

2. The presence-detection device of claim 1, the operations further comprising:
generating, at least partly using the microphone and during the first period of time, third data representing a noise signal in the environment;
determining, using the third data, a first signal-to-noise ratio (SNR) value for a first ultrasonic frequency range;
determining, using the third data, a second SNR value for a second ultrasonic frequency range;
determining that the first SNR value is greater than the second SNR value; and
configuring the loudspeaker to emit a third ultrasonic signal at a carrier frequency that is within the first ultrasonic frequency range.

3. The presence-detection device of claim 1, the operations further comprising:
causing the loudspeaker to emit audible sound at a first power level for a third period of time;
determining, based at least in part on the first power level, a second power level at which to emit the first ultrasonic signal; and
configuring the loudspeaker to emit the first ultrasonic signal at the second power level at least partly during the second period of time.

4. The presence-detection device of claim 1, the operations further comprising:
causing the loudspeaker to output the first ultrasonic signal at a first power level for a first time duration; and
causing the loudspeaker to output the first ultrasonic signal at a second power level after the first time duration, wherein the second power level is higher than the first power level,
wherein the reflected signal corresponds to the first ultrasonic signal output at the first power level.

5. The presence-detection device of claim 1, wherein the first ultrasonic signal is emitted at a first power level, the operations further comprising:
causing the loudspeaker to emit audible sound at a second power level at least partly concurrent to the first ultrasonic signal;
receiving input indicating that the audible sound is to be emitted at a third power level; and
causing, based at least in part on the third power level, the loudspeaker to emit the first ultrasonic signal at a fourth power level.

6. A computing device comprising:
a loudspeaker;
a microphone;
one or more processors; and
one or more computer-readable media storing computer-executable instructions that, when executed by the one or more processors, cause the one or more processors to perform operations comprising:
causing the loudspeaker to emit a first ultrasonic signal at a first power level into an environment of the computing device, wherein the first power level is greater than or equal to a threshold power level associated with detection of motion;
receiving a reflected signal corresponding to the first ultrasonic signal, the reflected signal originating at an object in the environment;
generating, at least partly using the microphone, first data representing the reflected signal;
determining, using the first data, that the object is in motion;
in response to determining that the object is in motion, causing the loudspeaker to emit, for a first period of time, a second ultrasonic signal at a second power level that is less than the threshold power level;
subsequent to the first period of time, causing the loudspeaker to emit a third ultrasonic signal at the first power level into the environment.

7. The computing device of claim 6, the operations further comprising:
causing the loudspeaker to emit audible sound at a first power level for a second period of time;
determining, based at least in part on the first power level, a second power level at which to emit the first ultrasonic signal; and
configuring the loudspeaker to emit the first ultrasonic signal at the second power level at least partly during the second period of time.

8. The computing device of claim 6, the operations further comprising:
causing the loudspeaker to increase emission of the first ultrasonic signal from an initial power level to the first power level for a first time duration;
wherein the reflected signal corresponds to the first ultrasonic signal output at the first power level.

9. The computing device of claim 6, wherein the reflected signal is a first reflected signal, the operations further comprising:
receiving a second reflected signal corresponding to the third ultrasonic signal;
generating, at least partly using the microphone, second data representing the second reflected signal;
determining, using the second data, that the object is in motion; and based at least in part on the first data and the second data indicating that the object is in motion, causing the loudspeaker to emit, for a second period of time, a fourth ultrasonic signal at the second power, the second period of time being greater than the first period of time.

10. The computing device of claim 6, wherein the first ultrasonic signal is emitted at a first power level, the operations further comprising:
causing the loudspeaker to emit audible sound at a second power level at least partly concurrent to the first ultrasonic signal;
receiving input indicating that the audible sound is to be emitted at a third power level; and
causing, based at least in part on the third power level, the loudspeaker to emit the first ultrasonic signal at a fourth power level.

11. A method comprising:
emitting, by a loudspeaker of a computing device, a first ultrasonic signal into an environment;
receiving a first reflected signal corresponding to the first ultrasonic signal, the first reflected signal originating at an object in the environment;
generating, at least partly using a microphone of the computing device, first data representing the first reflected signal;
determining, using the first data, that the object is in motion;
in response to determining that the object is in motion, causing the loudspeaker to emit an ultrasonic ramp signal, the ultrasonic ramp signal being emitted at different power levels that increase from a first power level to a second power level;
receiving a second reflected signal corresponding to the ultrasonic ramp signal, the second reflected signal originating at the object;
generating, at least partly using the microphone, second data representing the second reflected signal; and
determining, using the second data, that the object is in motion.

12. The method of claim 11, the ultrasonic ramp signal being a first ultrasonic ramp signal, further comprising, in response to determining that the object is in motion using the second data, causing the loudspeaker to emit a second ultrasonic ramp signal into the environment.

13. The method of claim 11, further comprising:
causing the loudspeaker to emit audible sound at a third power level at least partly while the ultrasonic ramp signal is being emitted;
determining, based at least in part on the third power level, the first power level.

14. The method of claim 11, further comprising:
causing the loudspeaker to output the first ultrasonic signal at a third power level for a first time duration; and
causing the loudspeaker to output the first ultrasonic signal at a fourth power level after the first time duration, wherein the fourth power level is higher than the third power level,
wherein the first reflected signal corresponds to the first ultrasonic signal output at the third power level.

15. The method of claim 11, wherein the ultrasonic ramp signal is a first ultrasonic ramp signal, further comprising:
predicting, using the second reflected signal, a third power level at which a future ultrasonic signal is to be emitted at to detect the object in motion; and
causing the loudspeaker to emit a second ultrasonic ramp signal, the second ultrasonic ramp signal being emitted at different power levels that increase from a fourth power level that is less than the third power level.

16. The method of claim 11, wherein the ultrasonic ramp signal is a first ultrasonic ramp signal, further comprising:
causing the loudspeaker to stop emitting the first ultrasonic ramp signal in response to determining that the object is in motion; and
causing the loudspeaker to emit a second ultrasonic ramp signal.

17. The method of claim 11, further comprising, prior to emitting the ultrasonic ramp signal, causing the loudspeaker to decrease emission of the first ultrasonic signal to the first power level.

18. The method of claim 11, wherein the ultrasonic signal was emitted at a fourth power level that is greater than the first power level.

19. The presence-detection device of claim 1, wherein the second period of time is greater than the first period of time.

* * * * *